US012783014B2

(12) United States Patent
Larsen et al.

(10) Patent No.: US 12,783,014 B2
(45) Date of Patent: Nov. 3, 2026

(54) HINGE AND CHASSIS FOR FLEXIBLE DISPLAY

(71) Applicant: Intel Corporation, Santa Clara, CA (US)

(72) Inventors: Denica N. Larsen, Portland, OR (US); Chunlin Bai, ChengDu (CN); Prosenjit Ghosh, Portland, OR (US); Surya Pratap Mishra, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 273 days.

(21) Appl. No.: 18/694,685

(22) PCT Filed: Sep. 24, 2021

(86) PCT No.: PCT/CN2021/120221
§ 371 (c)(1),
(2) Date: Mar. 22, 2024

(87) PCT Pub. No.: WO2023/044726
PCT Pub. Date: Mar. 30, 2023

(65) Prior Publication Data
US 2025/0123657 A1 Apr. 17, 2025

(51) Int. Cl.
*G06F 1/16* (2006.01)

(52) U.S. Cl.
CPC .......... *G06F 1/1681* (2013.01); *G06F 1/1641* (2013.01); *G06F 1/1652* (2013.01)

(58) Field of Classification Search
CPC .... G06F 1/1681; G06F 1/1641; G06F 1/1652; G06F 1/1637; G06F 1/181; G06F 1/203
See application file for complete search history.

(56) References Cited

U.S. PATENT DOCUMENTS 10,036,188 B1 * 7/2018 Yao .......................... E05D 3/122
11,194,366 B2 * 12/2021 Cheng .................. G06F 1/1626
(Continued)

FOREIGN PATENT DOCUMENTS

CN 111381630 A 7/2020

OTHER PUBLICATIONS

PCT/CN2021/120221 International Search Report and Written Opinion of the International Searching Authority dated Jun. 1, 2022 (9 pages).

*Primary Examiner* — Rockshana D Chowdhury
(74) *Attorney, Agent, or Firm* — Banner & Witcoff, Ltd.

(57) ABSTRACT

Particular embodiments described herein provide for an electronic device that can be configured to include a chassis, where the chassis includes a first chassis portion and a second chassis portion, a flexible display supported by the chassis, and a hinge. The hinge includes a first chassis attachment housing coupled to the first chassis portion, a first chassis portion lift arm coupled to the first chassis attachment housing, a first hinge pivot coupled to the first chassis portion lift arm, a second chassis attachment housing coupled to the second chassis portion, a second chassis portion lift arm coupled to the second chassis attachment housing, and a second hinge pivot coupled to the second chassis portion lift arm. The first chassis portion lift arm extends to increase a first distance between the first chassis attachment housing and the first hinge pivot and the second chassis portion lift arm extends to increase a second distance between the second chassis attachment housing and the second hinge pivot as the flexible display is bent.

20 Claims, 22 Drawing Sheets

(56) References Cited

U.S. PATENT DOCUMENTS

| | | | | |
|---|---|---|---|---|
| 11,729,932 | B2 * | 8/2023 | Yun | G06F 1/1641<br>361/807 |
| 11,737,223 | B2 * | 8/2023 | Lee | E05D 1/04<br>361/809 |
| 11,812,568 | B2 * | 11/2023 | Xie | G06F 1/1681 |
| 11,920,395 | B2 * | 3/2024 | Quynh | E05D 3/122 |
| 11,940,839 | B2 * | 3/2024 | Cho | G06F 1/1641 |
| 11,977,421 | B2 * | 5/2024 | Yang | G06F 1/1681 |
| 12,093,087 | B2 * | 9/2024 | Liu | H04M 1/022 |
| 12,096,572 | B2 * | 9/2024 | Kim | G06F 1/1641 |
| 12,360,575 | B2 * | 7/2025 | Lin | G06F 1/1681 |
| 12,401,732 | B2 * | 8/2025 | Hong | F16C 11/04 |
| 12,421,996 | B2 * | 9/2025 | Park | F16C 11/04 |
| 12,429,084 | B2 * | 9/2025 | Wang | F16C 11/04 |
| 12,429,924 | B2 * | 9/2025 | Feng | G06F 1/16 |
| 12,504,792 | B2 * | 12/2025 | Feng | G06F 1/1681 |
| 2011/0063783 | A1 * | 3/2011 | Shim | G06F 1/1615<br>361/679.01 |
| 2017/0254127 | A1 * | 9/2017 | Uchiyama | G06F 1/1601 |
| 2018/0196468 | A1 * | 7/2018 | Watamura | G06F 1/1652 |
| 2019/0032380 | A1 * | 1/2019 | Wu | H04M 1/022 |
| 2019/0166703 | A1 * | 5/2019 | Kim | G06F 1/1616 |
| 2019/0346889 | A1 * | 11/2019 | Chen | F16C 11/04 |
| 2020/0166974 | A1 * | 5/2020 | Ai | G06F 1/1616 |
| 2020/0264673 | A1 * | 8/2020 | Kim | G06F 1/1652 |
| 2020/0264674 | A1 * | 8/2020 | Km | G06F 1/1681 |
| 2021/0011513 | A1 * | 1/2021 | Watamura | G06F 1/1652 |
| 2021/0034117 | A1 * | 2/2021 | Torres | E05D 3/06 |
| 2021/0067614 | A1 * | 3/2021 | Cheng | G06F 1/1681 |
| 2021/0325937 | A1 * | 10/2021 | Siddiqui | G06F 1/1683 |
| 2022/0011827 | A1 * | 1/2022 | Kim | F16C 11/04 |
| 2022/0210937 | A1 * | 6/2022 | Yun | H05K 5/0226 |
| 2023/0004198 | A1 * | 1/2023 | Kondo | G06F 1/1652 |
| 2024/0074075 | A1 * | 2/2024 | Kim | G06F 1/1616 |
| 2024/0218902 | A1 * | 7/2024 | Feng | F16C 11/04 |
| 2024/0248514 | A1 * | 7/2024 | Kang | F16C 11/04 |
| 2025/0013268 | A1 * | 1/2025 | Zhan | H04M 1/0268 |
| 2025/0123657 | A1 * | 4/2025 | Larsen | G06F 1/1681 |
| 2025/0165042 | A1 * | 5/2025 | Xiao | G09F 9/301 |
| 2025/0165043 | A1 * | 5/2025 | Jung | G06F 1/1681 |
| 2025/0258522 | A1 * | 8/2025 | Zhang | G06F 1/1652 |
| 2025/0344329 | A1 * | 11/2025 | Cho | G06F 1/16 |
| 2025/0373718 | A1 * | 12/2025 | Liu | H04M 1/0216 |

* cited by examiner

HINGE AND CHASSIS FOR FLEXIBLE DISPLAY

TECHNICAL FIELD

This disclosure relates in general to the field of computing, and more particularly, to a hinge and chassis for a flexible display.

BACKGROUND

End users have more electronic device choices than ever before. A number of prominent technological trends are currently afoot (e.g., more computing devices, more devices that can change into different configurations, etc.), and these trends are changing the electronic device landscape. One of the technological trends is a flexible display. A flexible display is an electronic visual display that can bend or flex.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which.

Figure 1A:
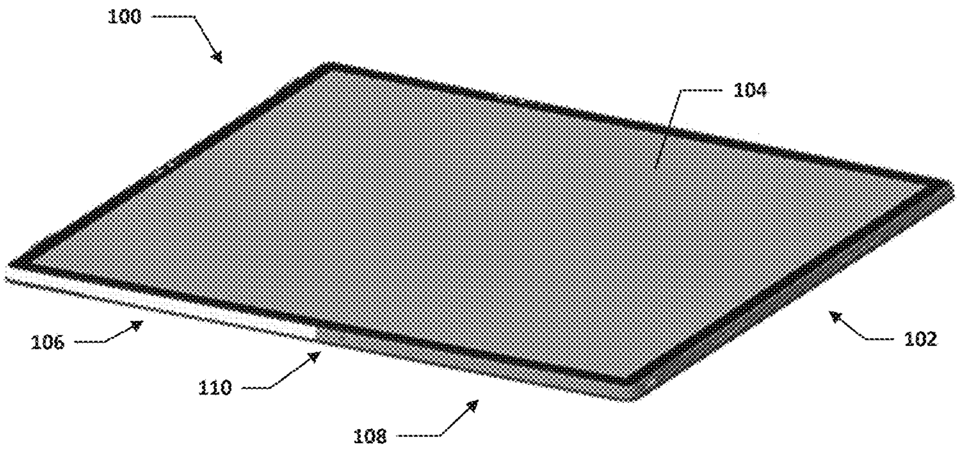
FIGS. 1A-1C are simplified block diagrams of a system to enable a hinge and chassis for a flexible display, in accordance with an embodiment of the present disclosure.

The FIGURES of the drawings are not necessarily drawn to scale, as their dimensions can be varied considerably without departing from the scope of the present disclosure.

DETAILED DESCRIPTION

Example Embodiments

The following detailed description sets forth examples of apparatuses, methods, and systems relating to enabling a hinge and chassis for a flexible display. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

The terms “over,” “under,” “below,” “between,” and “on” as used herein refer to a relative position of one layer or component with respect to other layers or components. For example, one layer disposed over or under another layer may be directly in contact with the other layer or may have one or more intervening layers. Moreover, one layer disposed between two layers may be directly in contact with the two layers or may have one or more intervening layers. In contrast, a first layer “directly on” a second layer is in direct contact with that second layer. Similarly, unless explicitly stated otherwise, one feature disposed between two features may be in direct contact with the adjacent features or may have one or more intervening layers.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example. The term "about" indicates a tolerance of twenty percent (20%). For example, about one (1) mm would include one (1) mm and +0.2 mm from one (1) mm. Similarly, terms indicating orientation of various elements, for example, "coplanar," "perpendicular," "orthogonal," "parallel," or any other angle between the elements generally refer to being within plus or minus five to twenty percent (+/−5-20%) of a target value based on the context of a particular value as described herein or as known in the art.

Figure 1B:
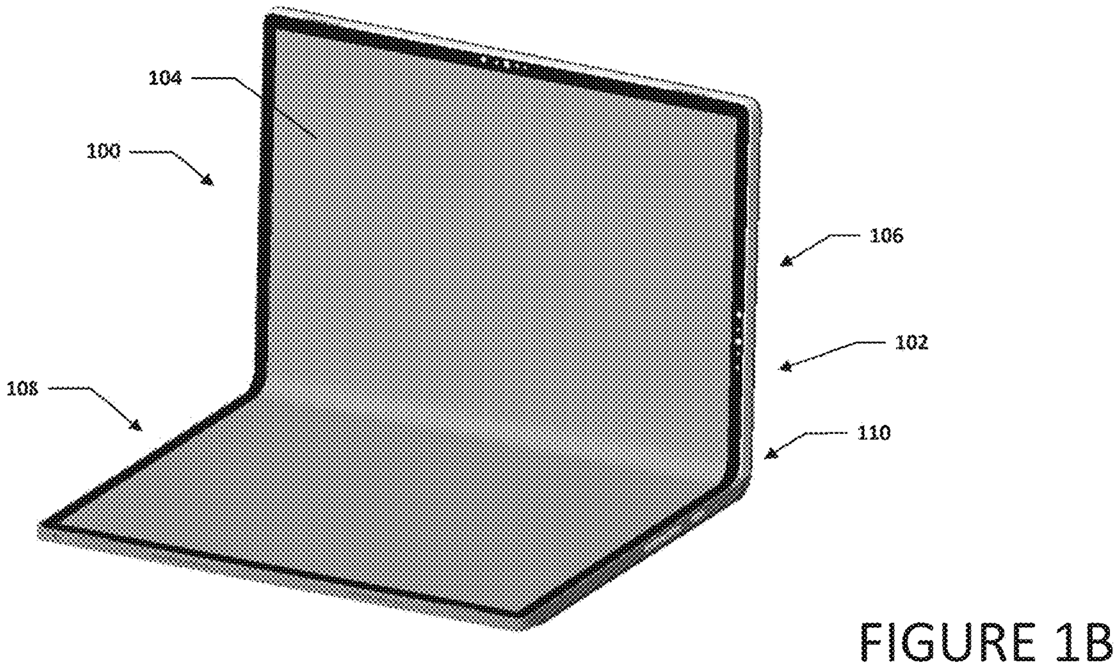
Figure 1C:
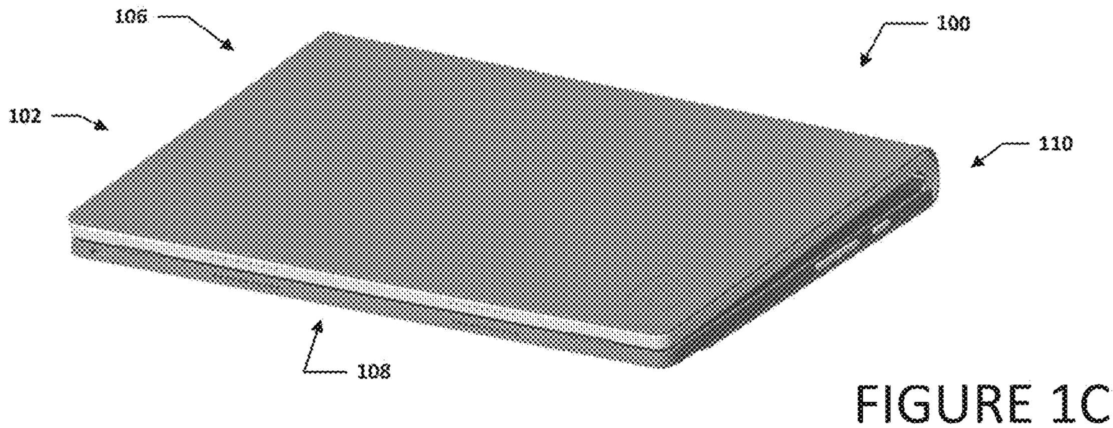

FIGS. 1A-1C are simplified block diagrams of an electronic device 100 configured with a hinge and chassis for a flexible display, in accordance with an embodiment of the present disclosure. In an example, the electronic device 100 can include a chassis 102 and a flexible display 104. The chassis 102 can include a first portion chassis 106 and a second portion chassis 108. The first portion chassis 106 can be rotationally or pivotably coupled to the second portion chassis 108 using a hinge 110.

As illustrated in FIG. 1A, the electronic device 100 is in a flat configuration with the flexible display 104 on a first side of the electronic device 100 and the second portion chassis 108 is on a second opposite side of the electronic device 100. The first portion chassis 106 and the second portion chassis 108 provide a relatively flat and uniform surface for the flexible display 104. As illustrated in FIG. 1B, the first portion chassis 106 can be rotated or pivoted about the hinge 110 towards the second portion chassis 108 such that the flexible display 104 is bent and the electronic device 100 is in an open configuration. As illustrated in FIG. 1C, the first portion chassis 106 can be rotated about the hinge 110 towards the second portion chassis 108 such that the flexible display 104 is bent and the electronic device 100 is in a closed configuration with the flexible display 104 facing inward.

The flexible display 104 may be a foldable organic light emitting diode (FOLED) display or some other flexible display. As the electronic device 100 is bent, the first portion chassis 106, the second portion chassis 108, and/or the hinge 110 can accommodate deformations in the flexible display 104. This allows the electronic device 100 to provide the support for the flexible display 104 while accommodating the deformation in the flexible display 104 as the electronic device 100 is bent. As used herein, the term "bend," and its derivatives (e.g., "bent") includes "curve," "fold," and other similar terms that connote moving one end of an object towards an opposite end of the object (e.g., moving the first portion chassis 106 of the electronic device 100 towards the second portion chassis 108 of the electronic device 100).

As the electronic device 100 is bent, it experiences a distortion such that material nearer the outside convex surface of the bend is forced to stretch and comes into tension, while material nearer the inside concave surface of the bend comes into compression. In the cross section of the electronic device 100, there is a plane called a neutral axis that separates the tension and compression zones. The neutral axis is an area within the bend where the material goes through no physical change during formation of the bend. On the outside of the neutral axis, the material of electronic device 100 is expanding while on the inside of the neutral axis, the material of the electronic device 100 is compressing. This causes the inside surface, which includes the flexible display 104, to extend outside or past the outside surface, which includes the hinge 110, the first portion chassis 106, and the second portion chassis 108. More specifically, the flexible display 104, being inside of the bent neutral axis, needs to bend to a smaller radius due to the bending arc length of the flexible display 104 being smaller than the bending arc length of the hinge 110 and therefore, the ends of the flexible display 104 will move further and are longer than the ends of the chassis 102. The electronic device 100 can be configured to allow the flexible display 104 and the hinge 110, the first portion chassis 106, and/or the second portion chassis 108 to move relative to each other to accommodate the change in position of the first portion chassis 106, the second portion chassis 108, and the hinge 110 relatively to the flexible display 104 and the ends of the flexible display 104 and the chassis 102 are in the same plane when the electronic device 100 is in a flat configuration as well as when the electronic device 100 is bent and/or transitioning or has transitioned to a closed configuration (as illustrated in FIG. 1C).

The electronic device 100 can be configured to allow the chassis 102 and the flexible display 104 to move relative to each other to accommodate the change in position of the chassis 102 relatively to the flexible display 104 such that the ends of the chassis 102 and the flexible display 104 are in the same plane when the electronic device 100 is in a flat configuration and is bent and/or transitioning or has transitioned to a closed configuration. In an example, the chassis 102 is designed to support the flexible display 104 in a lay-flat configuration as well as when the flexible display 104 is bent from about zero degrees (0°) to about one-hundred and eighty degrees (180°) without damaging the flexible display 104. In another example, the chassis 102 is designed to support the flexible display 104 when the flexible display 104 is bent from about zero degrees (0°) to about three-hundred and sixty degrees (360°) of rotation without damaging the flexible display 104.

The chassis 102 and/or the hinge 110 are configured to provide support for the flexible display 104 while accommodating the change in position of the chassis 102 and/or the hinge 110 relatively to the flexible display 104 as the flexible display 104 is bent. If the chassis 102 and/or the hinge 110 are not configured to accommodate the change in position relative to the flexible display 104 as the flexible display 104 is bent, the flexible display 104 could become damaged due to the stresses generated from the bend. In a specific example, to accommodate the change in position of the chassis 102 and/or the hinge 110 relatively to the flexible display 104, the chassis 102 and/or the hinge 110 are configured to provide support for the flexible display 104 by means of elongating the coupling or connection of the chassis 102 and/or the hinge 110.

It is to be understood that other embodiments may be utilized and structural changes may be made without departing from the scope of the present disclosure. Substantial flexibility is provided in that any suitable arrangements and configuration may be provided without departing from the teachings of the present disclosure.

For purposes of illustrating certain example techniques, the following foundational information may be viewed as a basis from which the present disclosure may be properly explained. End users have more media and communications choices than ever before. A number of prominent technological trends are currently afoot (e.g., more computing elements, more online video services, more Internet traffic, more complex processing, etc.), and these trends are changing the expected performance of devices as devices and systems are expected to increase performance and function. One of the technological trends is for a bigger display and a higher screen to body ratio. One way to achieve the bigger display and higher screen to body ratio is to use a flexible display. A flexible display is an electronic visual display that can bend. One issue with flexible displays is the support or chassis for the flexible display as the support or chassis can often limit the form-factor of the device.

A typical flexible display is a rigid composite of plastic, adhesive, metal, and others material. Because the flexible display is a rigid composite, the layers of the flexible display can become stretched and compressed while the flexible display is being folded and unfolded and the flexible display can be prone to permanent deformations that will be detrimental to the device aesthetics and can also reduce the user experience due to a distorted image. More specifically, when the flexible display and support are in a flat configuration, the ends of the flexible display and the support are the same. However, when the flexible display and support bend, the length of the flexible display and the ends of the support become different. This is because as material is bent, the inside portion undergoes compression due to the smaller radius in the bending arc length and the outside portion undergoes expansion or is stretched due to the larger radius in the bending arch length. This causes the ends of the inside surface to extend past the ends of the outside surface. Some current devices that include a flexible display do not provide the necessary support for the flexible display while accommodating the required change in position of the support relative to the flexible display as the flexible display is bent. Currently, there is a need for a mechanism for flexible display devices that allows the flexible display to be relatively flat and can accommodate the change in position of the support of the flexible display relatively to the flexible display as the flexible display is bent.

A hinge and chassis to help mitigate the challenges of supporting a flexible display, as outlined in FIGS. 1A-1C, can resolve these issues (and others). For example, an electronic device (e.g., the electronic device 100) can be configured to allow for the chassis (e.g., the chassis 102) of the electronic device and/or the hinge of the electronic device (e.g., the hinge 110) to accommodate deformations in a flexible display (e.g., the flexible display 104) as the electronic device is bent. The hinge and chassis can allow the electronic device to provide the support for the flexible display while accommodating the deformation in the flexible display as the electronic device is bent. In a specific example, the hinge can include synchronization gears to synchronize the rotation of a first portion chassis (e.g., the first portion chassis 106) relative to a second portion chassis (e.g., the second portion chassis 108) and accommodate the deformation in the flexible display as the electronic device is bent. Also, the first portion chassis and the second portion chassis can include a slide mechanism (e.g., a spring) that allows the electronic device to provide the support for the flexible display while accommodating the deformation in the flexible display as the electronic device is bent.

In some examples, the slide mechanism in the chassis and the synchronization gears in the hinge can be used together to accommodate the deformation in the flexible display as the electronic device is bent. In other examples, the synchronization gears in the hinge may be used without the slide mechanism in the chassis to accommodate the deformation in the flexible display as the electronic device is bent. In yet other examples, the slide mechanism in the chassis may be used without the synchronization gears in the hinge to accommodate the deformation in the flexible display as the electronic device is bent.

In a specific example, synchronization gears and lift arms can allow for a telescoping motion or growth as the flexible chassis is bent. The telescoping motion or growth of the hinge is necessary due to the additional arc length of the flexible chassis relative to the flexible display as the electronic device approaches a closed configuration (e.g., the flexible display, being inside of the bent neutral axis needs to bend to a smaller radius due to the bending arc length of the flexible display being smaller than the bending arc length of the flexible chassis) or the reduced arc length of the flexible chassis relative to the flexible display as the electronic device approaches a tablet configuration (e.g., the flexible display, being outside of the bent neutral axis, needs to bend to a larger radius due to the bending arc length of the flexible display being larger than the bending arc length of the flexible chassis). In an example, the hinge can expand as the electronic device is bent to accommodate the additional arc length of the chassis relative to the flexible display as the electronic device approaches a closed configuration or to accommodate the reduced arc length of the chassis relative to the flexible display as the electronic device approaches a tablet configuration.

The hinge can include a gear mechanism to help ensure a relatively smooth rotation and synchronization of the first portion chassis and the second portion chassis as the electronic device is bent. The hinge can also include a mechanism in the hinge that accommodate the length change as the electronic device is bent. More specifically, the hinge can include four or six gear members and lift-arms coupled to the first portion chassis and the second portion chassis that are driven by gear members. The gear members can help with the synchronization of the first portion chassis and the second portion chassis as the electronic device is bent and the lift arms can help accommodate the length change as the electronic device is bent.

In some examples, the hinge can include a flexible display sink to help minimize the stress on the flexible display by enabling a portion of the flexible display's length be stored or be displaced in the flexible display sink as the electronic device is bent. In a specific example, the flexible display sink can have a depth of about 0.8 mm and above and allow a portion of the flexible display's length be stored or be displaced in the flexible display sink as the electronic device is bent, depending on design choice and design constraints. In another specific example, the flexible display sink can allow up to about two (2) mm of the flexible display's length be stored or be displaced in the flexible display sink as the electronic device is bent, depending on design choice and design constraints In an example, a flexible display support can provide support for the flexible display, drive the length of the chassis, and help the flexible display retain an even shape or profile as the electronic device is bent. In some examples, the flexible display support is attached to the flexible display by an elastic mechanism (e.g., a spring) and can drive the length of the chassis. The hinge can be coupled to the flexible display support by an adhesive and a membrane material. In a specific example, the hinge can allow for the additional arc length of the flexible chassis relative to the flexible display as the electronic device approaches a closed configuration. The interaction of the gears in the hinge help to control the telescoping motion of the hinge to accommodate the change in the position of the chassis relative to the flexible display.

Figure 2A:
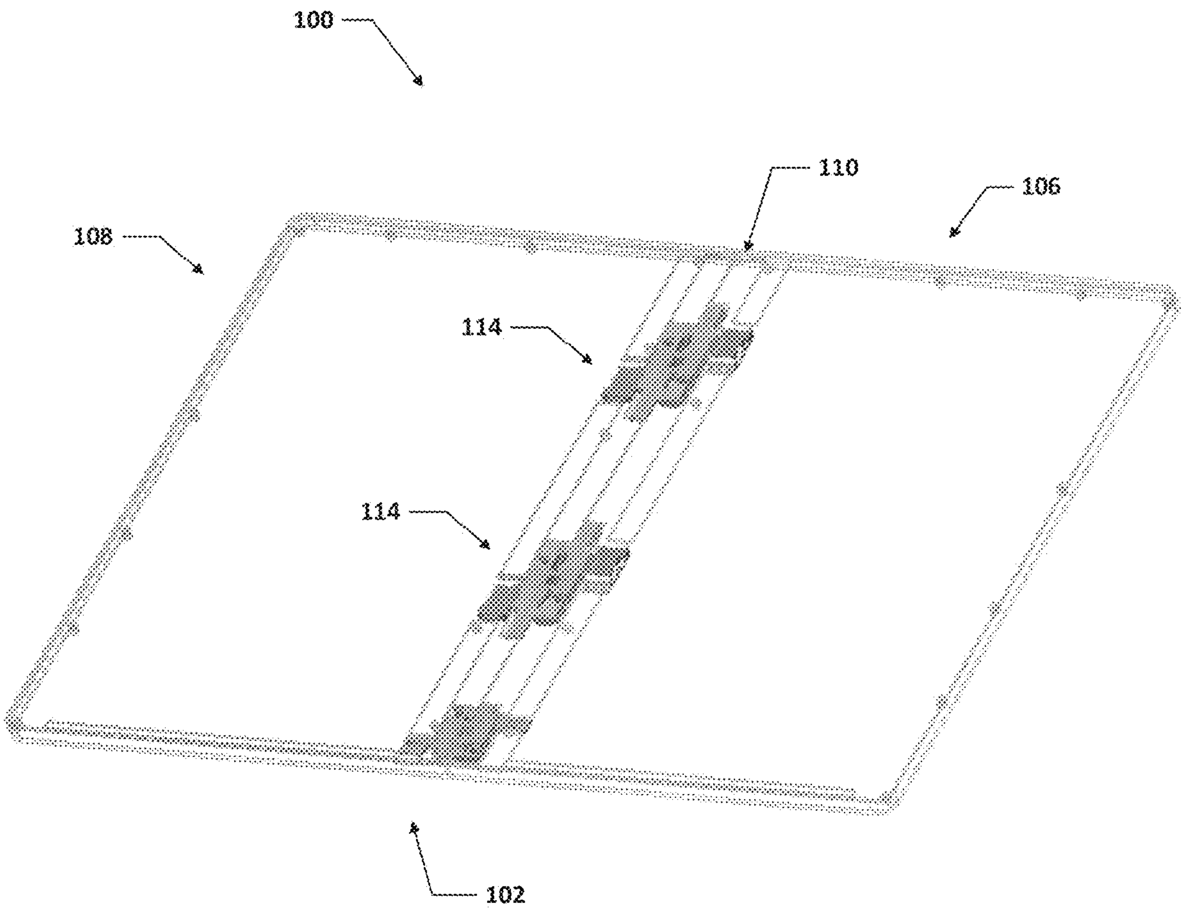
FIGS. 2A and 2B are simplified block diagrams of a portion of a system to enable a hinge and chassis for a flexible display, in accordance with embodiment of the present disclosure.

Turning to FIG. 2A, FIG. 2A is a simplified block diagram of a wire frame view of a portion of the electronic device 100 in a flat configuration, in accordance with an embodiment of the present disclosure. In an example, the electronic device 100 can include the chassis 102 and the hinge 110. The chassis 102 can include the first portion chassis 106 and the second portion chassis 108. The hinge 110 can include one or more synchronizing hinge mechanisms 114. Each of the one or more synchronizing hinge mechanisms 114 can include synchronization gears to synchronize the rotation of the first portion chassis 106 and the second portion chassis 108 and accommodate the deformation in the flexible display 104 (not shown) as the electronic device 100 is bent. The hinge 110 can also include a mechanism that can help accommodate the length change as the electronic device is bent. More specifically, the hinge 110 can include a flexible display sink (not shown) to help accommodate the deformation in the flexible display 104 (not shown) as the electronic device 100 is bent. Further, the hinge 110 can include one or more elastic mechanisms (e.g., one or more spring mechanisms) to help accommodate the deformation in the flexible display 104 (not shown) as the electronic device 100 is bent.

Figure 2B:
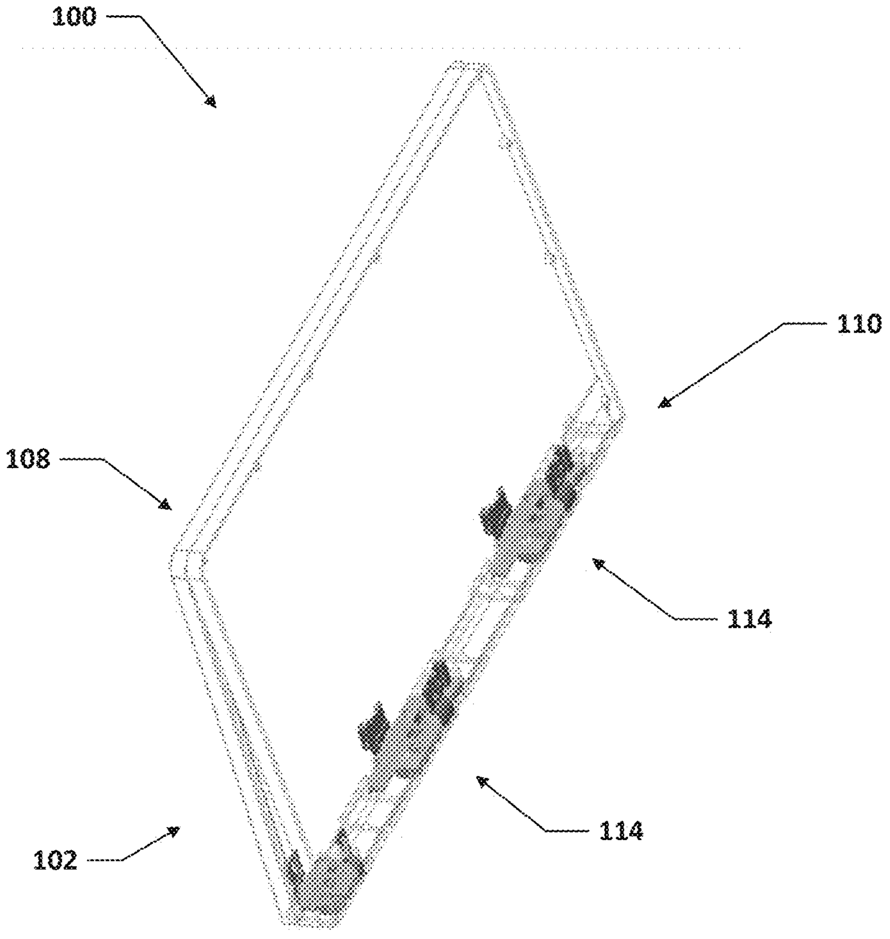

Turning to FIG. 2B, FIG. 2B is a simplified block diagram of a wire frame view of a portion of the electronic device 100 in a closed configuration, in accordance with an embodiment of the present disclosure. In an example, the electronic device 100 can include the chassis 102 and the hinge 110. The chassis 102 can include the first portion chassis 106 and the second portion chassis 108. The hinge 110 can include one or more synchronizing hinge mechanisms 114. Each of the one or more synchronizing hinge mechanisms 114 can include synchronization gears to synchronize the rotation of the first portion chassis 106 and the second portion chassis 108 and accommodate the deformation in the flexible display 104 (not shown) as the electronic device 100 is bent and transitions from the flat configuration illustrated in FIG. 2A to the closed configuration illustrated in FIG. 2B. The hinge 110 can also include a mechanism that can accommodate the length change as the electronic device 100 is bent and transitions from the flat configuration illustrated in FIG. 2A to the closed configuration illustrated in FIG. 2B. More specifically, the hinge 110 can include a flexible display sink (not shown) to help accommodate the deformation in the flexible display 104 (not shown) as the electronic device 100 is bent and transitions from the flat configuration illustrated in FIG. 2A to the closed configuration illustrated in FIG. 2B. Further, the hinge 110 can include one or more elastic mechanism (e.g., one or more spring mechanism) to help accommodate the deformation in the flexible display 104 (not shown) as the electronic device 100 is bent and transitions from the flat configuration illustrated in FIG. 2A to the closed configuration illustrated in FIG. 2B.

More specifically, the one or more synchronizing hinge mechanisms 114 can include lift arms that extend from each of the one or more synchronizing hinge mechanisms 114 to the first portion chassis 106 and the second portion chassis 108. Each lift arm can have an arc profile such when the electronic device 100 is the flat configuration illustrated in FIG. 2A, the lift arms are retracted into a housing. When the electronic device 100 is bent and transitions from the flat configuration illustrated in FIG. 2A to the closed configuration illustrated in FIG. 2B, the lift arms extend as the electronic device 100 is bent. When the electronic device 100 is bent and transitions from the closed configuration illustrated in FIG. 2B to back to the flat configuration illustrated in FIG. 2A, then the lift arms go into the housing. A gear between the lift arms can help the lift arms move along the arc and accommodate the length change as the electronic device 100 is bent.

Figure 3A:
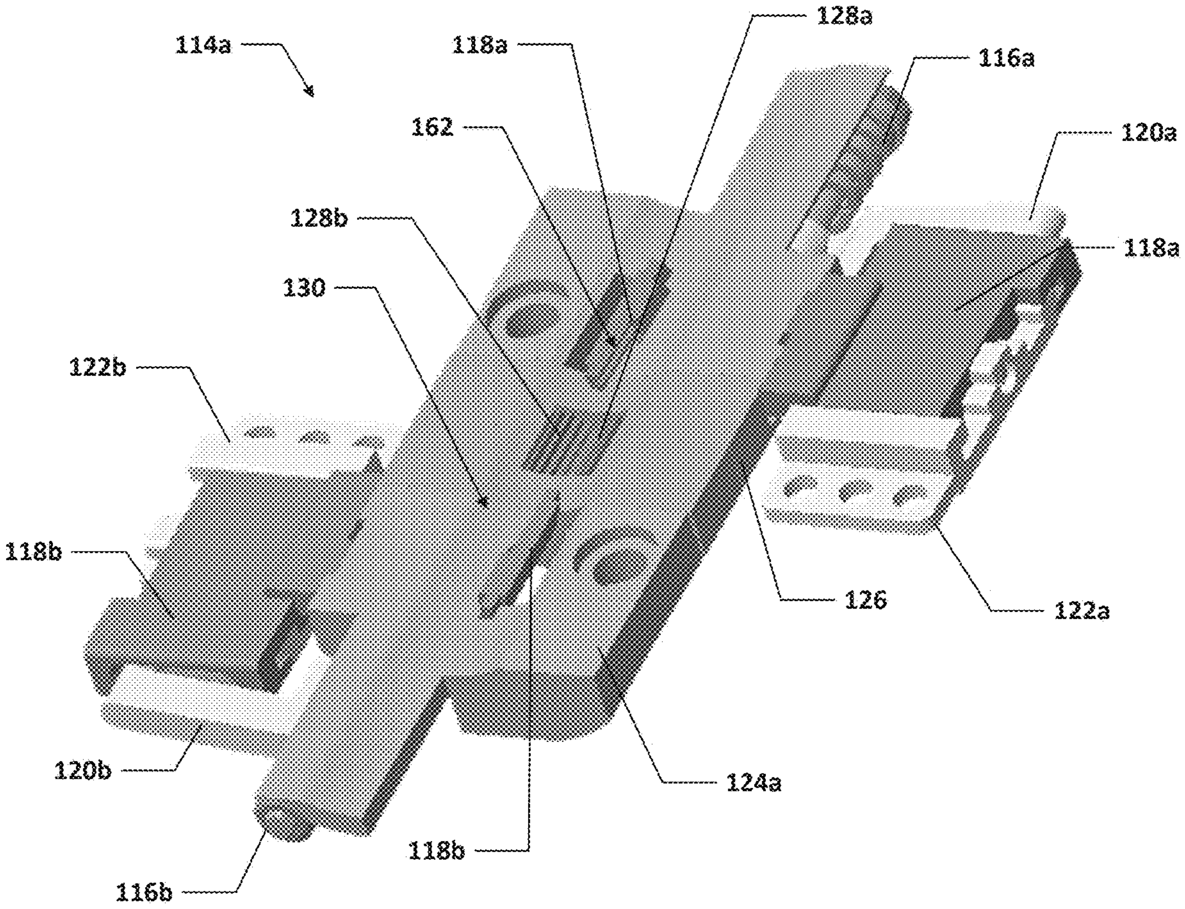
FIGS. 3A and 3B are simplified block diagrams of a portion of a system to enable a hinge and chassis for a flexible display, in accordance with an embodiment of the present disclosure.
Figure 3B:
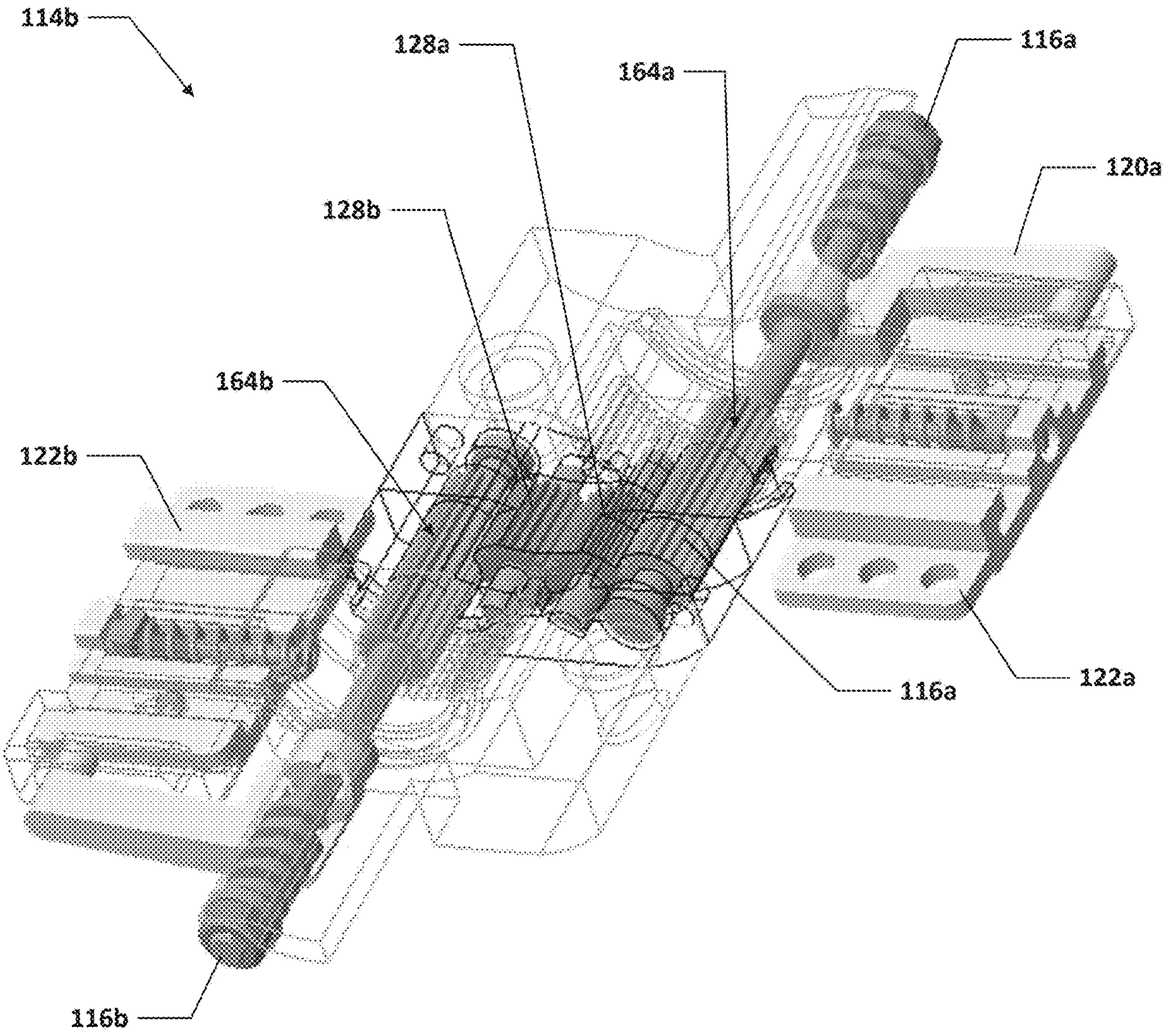

Turning to FIGS. 3A and 3B, FIGS. 3A and 3B are simplified block diagrams of a portion of a synchronizing hinge mechanism **114*a* in a flat configuration, in accordance with an embodiment of the present disclosure. The synchronizing hinge mechanism 114*a* can include a first hinge pivot 116*a*, a second hinge pivot 116*b*, a first chassis portion lift arm 118*a*, a second chassis portion lift arm 118*b*, a first lift arm guide 120*a*, a second lift arm guide 120*b*, a first chassis attachment housing 122*a*, a second chassis attachment housing 122*b*, a hinge housing 124*a* (not shown in FIG. 3B), a synchronization gear housing 126, a first synchronizing gear 128*a*, and a second synchronizing gear 128*b*. The hinge housing 124*a* can include a flexible display sink 130**.

Each of the first chassis portion lift arm **118*a* and the second chassis portion lift arm 118*b* can have an arch profile that allows each of the first chassis portion lift arm 118*a* and the second chassis portion lift arm 118*b* to extend and retract as an electronic device that includes the synchronizing hinge mechanism 114*a* is bent. A portion of the first chassis portion lift arm 118*a* and the second chassis portion lift arm 118*b* can have an arc profile and include teeth 162 (referenced in FIG. 3A with respect to the first chassis portion lift arm 118*a*). At least a portion of the first hinge pivot 116*a* can have a splined shaft 164*a* (referenced in FIG. 3B) that meshes with the teeth 162 on the first chassis portion lift arm 118*a* and at least a portion of the second hinge pivot 116*b* can have a splined shaft 164*b* (referenced in FIG. 3B) that meshes with the teeth 162 on the second chassis portion lift arm 118*b*. One end of the first chassis portion lift arm 118*a* (the portion with the teeth 162) can be rotatably or pivotably coupled to the first hinge pivot 116*a* (the portion of the first hinge pivot 116*a* that includes the splined shaft 164*a*) and a second end of the first chassis portion lift arm 118*a* can be coupled to the first portion chassis 106 (not shown). One end of the second chassis portion lift arm 118*b* (the portion with the teeth 162) can be rotatably or pivotably coupled to the second hinge pivot 116*b* (the portion of the second hinge pivot 116*b* that includes the splined shaft 164*b*) and a second end of the second chassis portion lift arm 118*b* can be coupled to the second portion chassis 108 (not shown). The first lift arm guide 120*a* can be coupled to the synchronization gear housing 126 and help guide the first chassis portion lift arm 118*a* during rotation when an electronic device that includes the synchronizing hinge mechanism 114*a* is bent. The second lift arm guide 120*b* can be coupled to the synchronization gear housing 126 and help guide the second chassis portion lift arm 118*b* during rotation when the electronic device that includes the synchronizing hinge mechanism 114*a*** is bent.

Figure 4A:
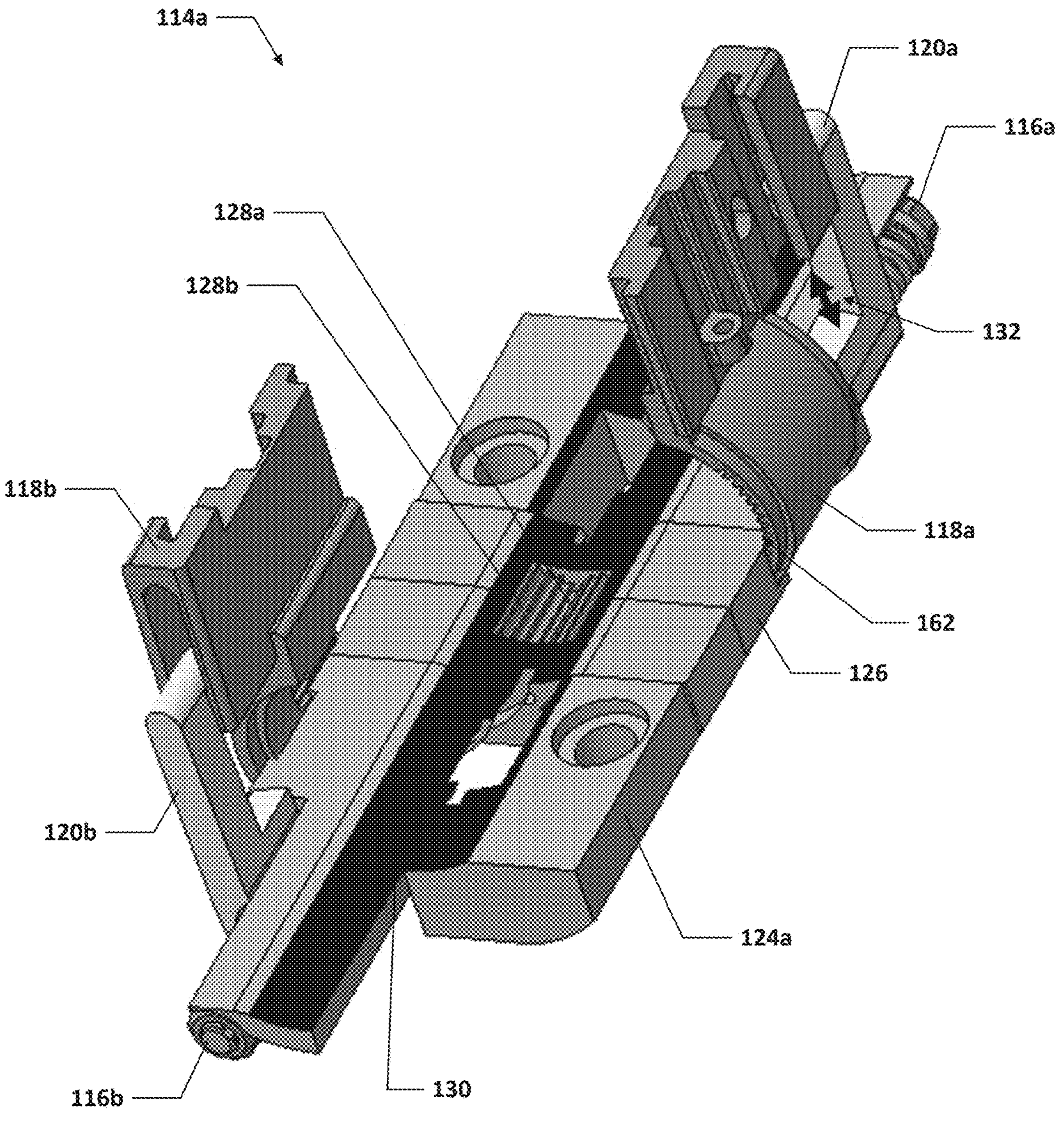
FIGS. 4A and 4B are simplified block diagrams of a portion of a system to enable a hinge and chassis for a flexible display, in accordance with an embodiment of the present disclosure.
Figure 4B:
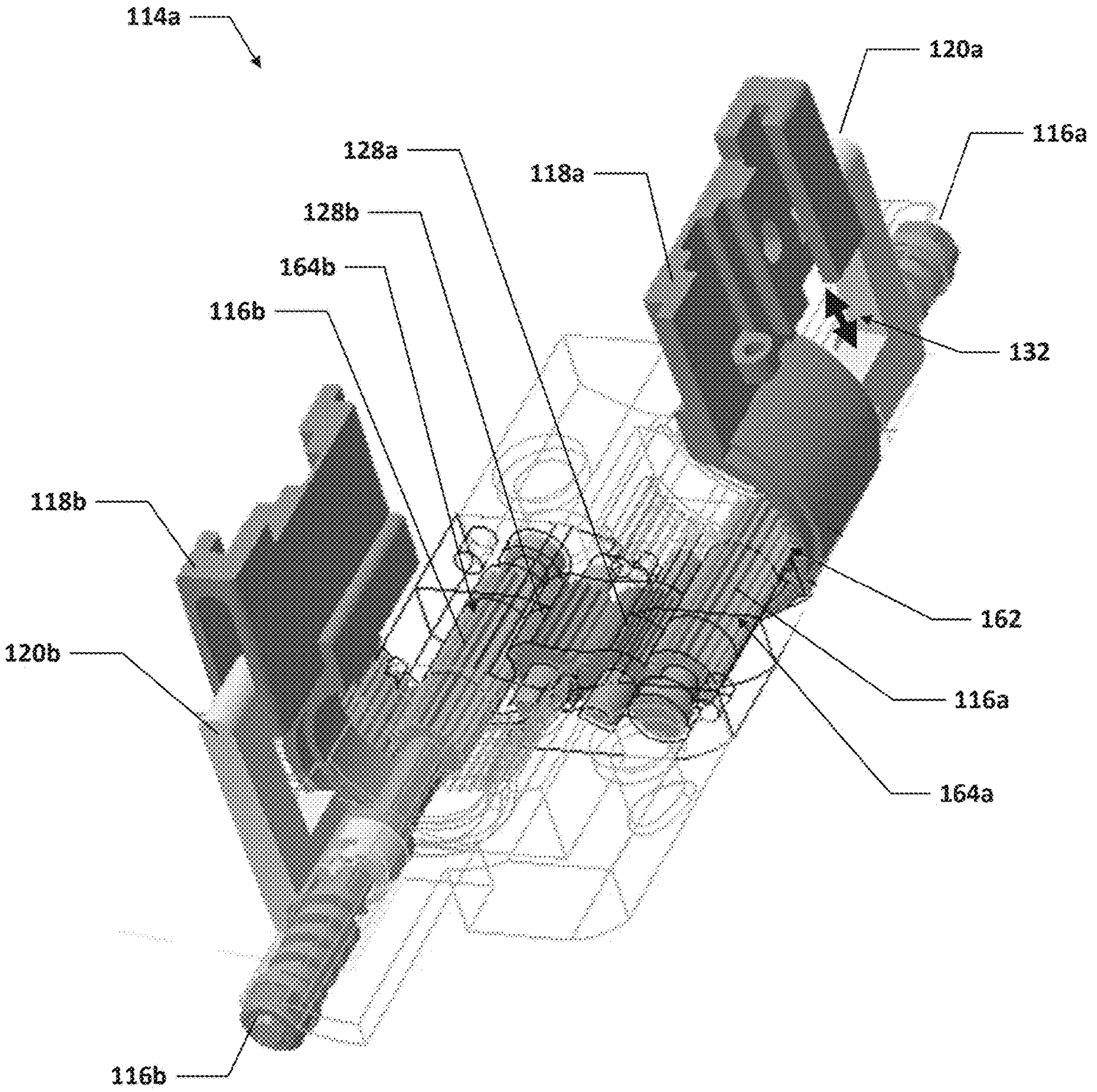

Turning to FIGS. 4A and 4B, FIGS. 4A and 4B are simplified block diagrams of a portion of the synchronizing hinge mechanism **114*a* in a closed configuration, in accordance with an embodiment of the present disclosure. The synchronizing hinge mechanism 114*a* can include the first hinge pivot 116*a*, the second hinge pivot 116*b*, the first chassis portion lift arm 118*a*, the second chassis portion lift arm 118*b*, the first lift arm guide 120*a*, the second lift arm guide 120*b*, the first chassis attachment housing 122*a* (not shown in), the second chassis attachment housing 122*b*, the hinge housing 124***a* (not shown in FIG. 4B), the synchronization gear housing 126, the first synchronizing gear 128*a*, and the second synchronizing gear 128*b*. The hinge housing 124*a* can include the flexible display sink 130.

A portion of the first chassis portion lift arm 118*a* and the second chassis portion lift arm 118*b* can include the teeth 162. At least a portion of the first hinge pivot 116*a* can have the splined shaft 164*a* (referenced in FIG. 4B) and at least a portion of the second hinge pivot 116*b* can have the splined shaft 164*b* (referenced in FIG. 4B). When the electronic device that includes the synchronizing hinge mechanism 114*a* is bent and the synchronizing hinge mechanism 114*a* is in a closed configuration, the first chassis portion lift arm 118*a* rotates around the first hinge pivot 116*a* and, due to the arc profile of the first chassis portion lift arm 118*a*, extends to increase a distance 132 between the first chassis portion lift arm 118*a* and the hinge housing 124*a*. Also, the second chassis portion lift arm 118*b* rotates around the second hinge pivot 116*b* and, due to the arch profile of the second chassis portion lift arm 118*b*, extends to increase the distance 132 (not referenced) between the second chassis portion lift arm 118*b* and the hinge housing 124*a*. Note that the distance 132 the first chassis portion lift arm 118*a* and the second chassis portion lift arm 118*a* extend is about the same distance to help provide even extension and accommodate the length change in the flexible display as the electronic device is bent. The first chassis portion lift arm 118*a* is coupled to the first portion chassis 106 (not shown) and the second chassis portion lift arm 118*a* is coupled to the second portion chassis 108 (not shown). As the electronic device is bent, the increase in length as the distance 132 between the first chassis portion lift arm 118*a* and the hinge housing 124*a* is increased and the distance 132 (not referenced) between the second chassis portion lift arm 118*b* and the hinge housing 124*a* is increased and the synchronizing hinge mechanism 114*a* can use the increase to accommodate the length change in the flexible display as the electronic device is bent.

The first lift arm guide 120*a* can help guide the first chassis portion lift arm 118*a* as it moves away from and towards the hinge housing 124*a*. Also, the second lift arm guide 120*b* can help guide the second chassis portion lift arm 118*b* as it moves away from and towards the hinge housing 124*a*. The hinge housing 124*a* can provide a protective covering for the first hinge pivot 116*a*, the second hinge pivot 116*b*, the first synchronizing gear 128*a*, and the second synchronizing gear 128*b*. The teeth 162 on the first chassis portion lift arm 118*a* can mesh and engage with the portion of the first hinge pivot 116*a* that includes the splined shaft 164*a* and the teeth 162 on the second chassis portion lift arm 118*b* can mesh and engage with the portion of the second hinge pivot 116*b* that includes the splined shaft 164*b* to help ensure relatively smooth rotation and synchronization of the first portion chassis 106 (not shown) and the second portion chassis 108 (not shown) as the electronic device is bent. In addition, the first synchronizing gear 128*a* and the second synchronizing gear 128*b* can help ensure relatively smooth rotation and synchronization of the first portion chassis 106 (not shown) and the second portion chassis 108 (not shown) as the electronic device is bent. The flexible display sink 130 can help reduce the stress on the flexible display by enabling a portion of the flexible display's length be stored or be displaced in the flexible display sink 130 as the electronic device is bent. In a specific example, the flexible display sink 130 can have a depth of about 0.8 mm and above and allow a portion of the flexible display's length be stored or be displaced in the flexible display sink 130 as the electronic device is bent.

Turning to FIGS. 5A-5E, FIGS. 5A-5E are simplified block diagrams of a cut away view of a portion of the electronic device 100*a*, in accordance with an embodiment of the present disclosure. The electronic device 100*a* can include the flexible display 104, the first portion chassis 106, and the second portion chassis 108. The first portion chassis 106 can be rotationally or pivotably coupled to the second portion chassis 108 using the hinge 110. The hinge can include one or more of the synchronizing hinge mechanisms 114*a*. The synchronizing hinge mechanism 114*a* can include the first hinge pivot 116*a*, the second hinge pivot 116*b*, the first chassis portion lift arm 118*a*, the second chassis portion lift arm 118*b*, the first lift arm guide 120*a*, the second lift arm guide 120*b*, and the hinge housing 124*a*. The hinge housing 124*a* can include the flexible display sink 130.

Figure 5A:
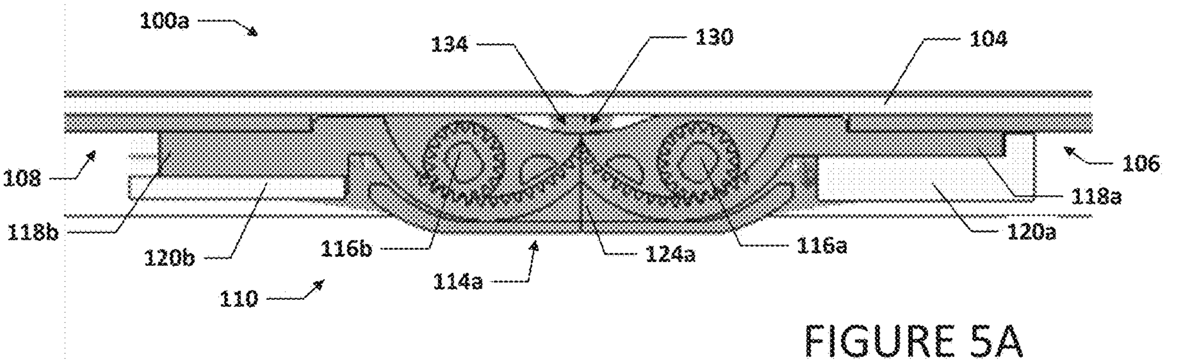
FIGS. 5A-5E are simplified block diagrams of a portion of a system to enable a hinge and chassis for a flexible display, in accordance with an embodiment of the present disclosure.

As illustrated in FIG. 5A, the electronic device 100*a* in a relatively flat configuration and the angle of the second portion chassis 108 relative to the first portion chassis 106 is about one hundred and eighty degrees (180°). When the electronic device 100*a* in a flat configuration, there is a flexible display sink gap 134 between the flexible display 104 and the surface of the flexible display sink 130. In some examples, the flexible display sink gap 134 is greater than two (2) millimeters. In other examples, the flexible display sink gap 134 may be between about 0.2 millimeters and about 3 millimeters and ranges therein (e.g., between about 0.5 and about 1 millimeter, or between about 1 and about 2 millimeters), depending on design choice and design constraints. As the electronic device is bent, the length change in the flexible display 104 as the electronic device 100*a* is bent can be at least partially be accommodated in the flexible display sink 130.

Figure 5B:
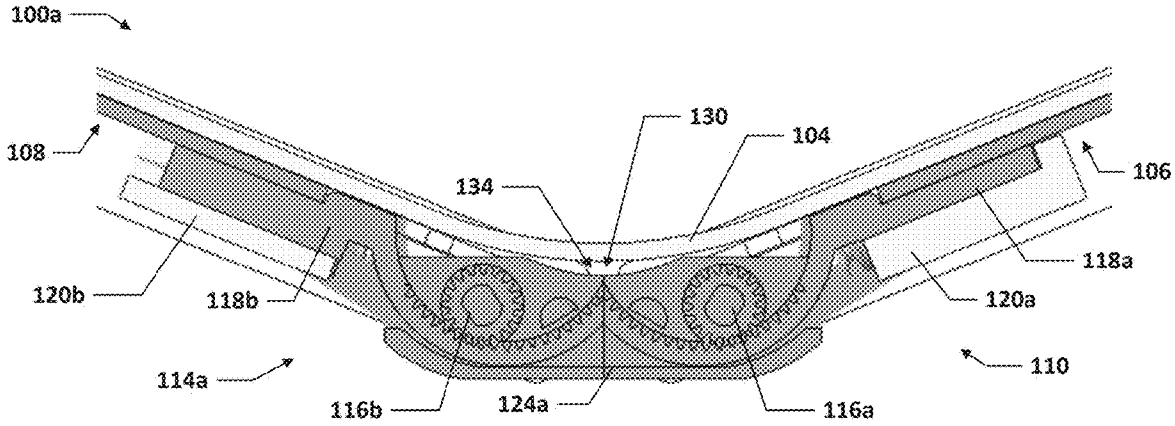

For example, turning to FIG. 5B, FIG. 5B is a simplified block diagram cut away view of the electronic device 100*a* in a bent configuration, in accordance with an embodiment of the present disclosure. As illustrated in FIG. 5B, the angle of the second portion chassis 108 relative to the first portion chassis 106 is about one hundred and thirty-five degrees (135°). When the electronic device 100*a* in the bent configuration illustrated in FIG. 5B, the flexible display sink gap 134 between the flexible display 104 and the surface of the flexible display sink 130 is reduced as compared to the flexible display sink gap 134 illustrated in FIG. 5A. The reduction of the flexible display sink gap 134 is due to the synchronizing hinge mechanism 114*a*, or more specifically, the flexible display sink 130, accommodating the length change in the flexible display 104 as the electronic device 100*a* is bent.

Figure 5C:
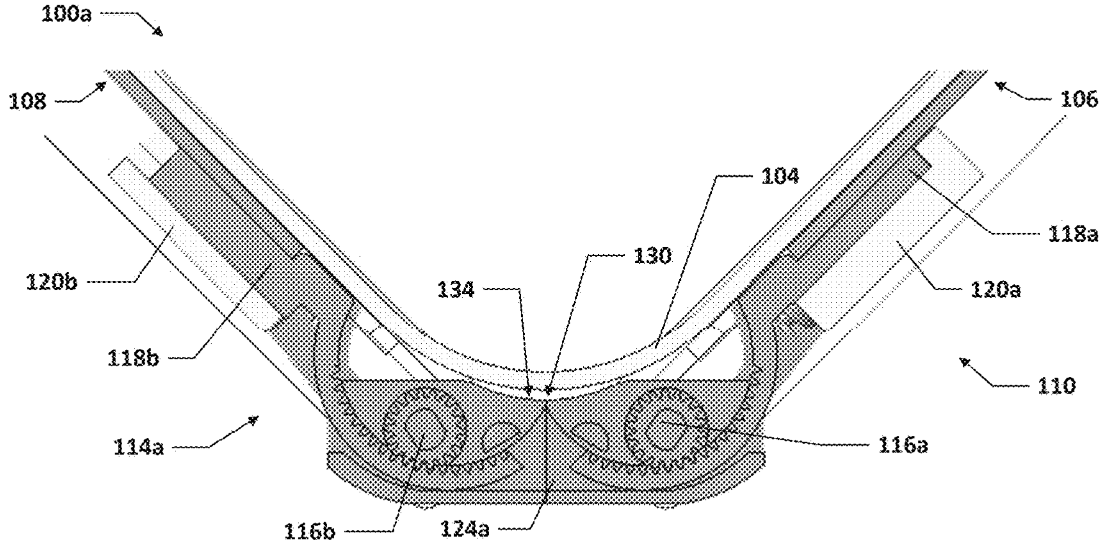

Turning to FIG. 5C, FIG. 5C is a simplified block diagram of a cut away view of a portion of the electronic device 100*a* in a bent configuration, in accordance with an embodiment of the present disclosure. For example, as illustrated in FIG. 5C, the angle of the second portion chassis 108 relative to the first portion chassis 106 is about ninety degrees (90°). When the electronic device 100*a* is in the bent configuration illustrated in FIG. 5C, the flexible display sink gap 134 between the flexible display 104 and the surface of the flexible display sink 130 is reduced as compared to the flexible display sink gap 134 illustrated in FIGS. 5A and 5B. The reduction of the flexible display sink gap 134 is due to the synchronizing hinge mechanism 114*a*, or more specifically, the flexible display sink 130, accommodating the length change in the flexible display 104 as the electronic device 100*a* is bent.

Figure 5D:
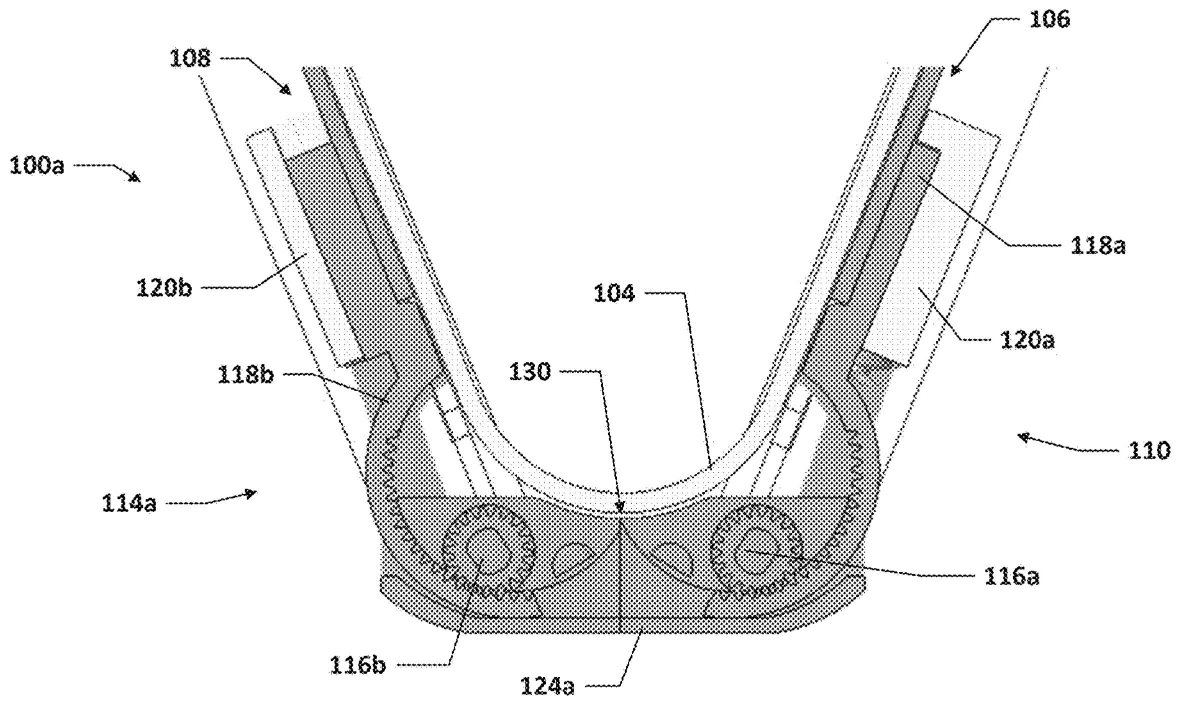

Turning to FIG. 5D, FIG. 5D is a simplified block diagram of a cut away view of a portion of the electronic device 100*a* in a bent configuration, in accordance with an embodiment of the present disclosure. For example, as illustrated in FIG. 5D, the angle of the second portion chassis 108 relative to the first portion chassis 106 is about forty-five degrees (45°). When the electronic device 100*a* is in the bent configuration illustrated in FIG. 5D, the flexible display sink gap 134 (not referenced) between the flexible display 104 and the surface of the flexible display sink 130 is reduced as compared to the flexible display sink gap 134 illustrated in FIGS. 5A-5C. The reduction of the flexible display sink gap 134 is due to the synchronizing hinge mechanism 114*a*, or more specifically, the flexible display sink 130, accommodating the length change in the flexible display 104 as the electronic device 100*a* is bent.

Figure 5E:
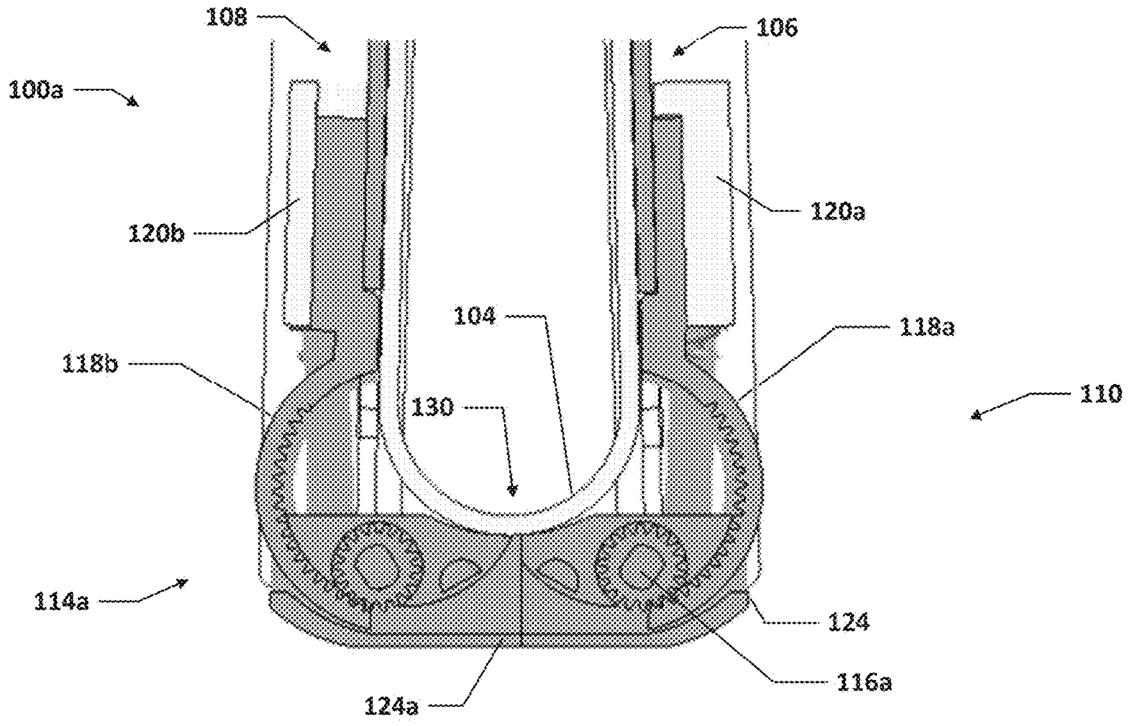

Turning to FIG. 5E, FIG. 5E is a simplified block diagram of a cut away view of a portion of the electronic device 100*a* in a closed configuration, in accordance with an embodiment of the present disclosure. For example, as illustrated in FIG. 5E, the first portion chassis 106 and the second portion chassis 108 are about parallel to each other and the angle of the second portion chassis 108 relative to the first portion chassis 106 is about zero degrees (0°). When the electronic device 100*a* is in the bent configuration illustrated in FIG. 5D, the flexible display sink gap 134 (not referenced) between the flexible display 104 and the surface of the flexible display sink 130 is reduced as compared to the flexible display sink gap 134 illustrated in FIGS. 5A-5C. The reduction of the flexible display sink gap 134 is due to the synchronizing hinge mechanism 114*a*, or more specifically, the flexible display sink 130, accommodating the length change in the flexible display 104 as the electronic device 100*a* is bent.

Figure 6A:
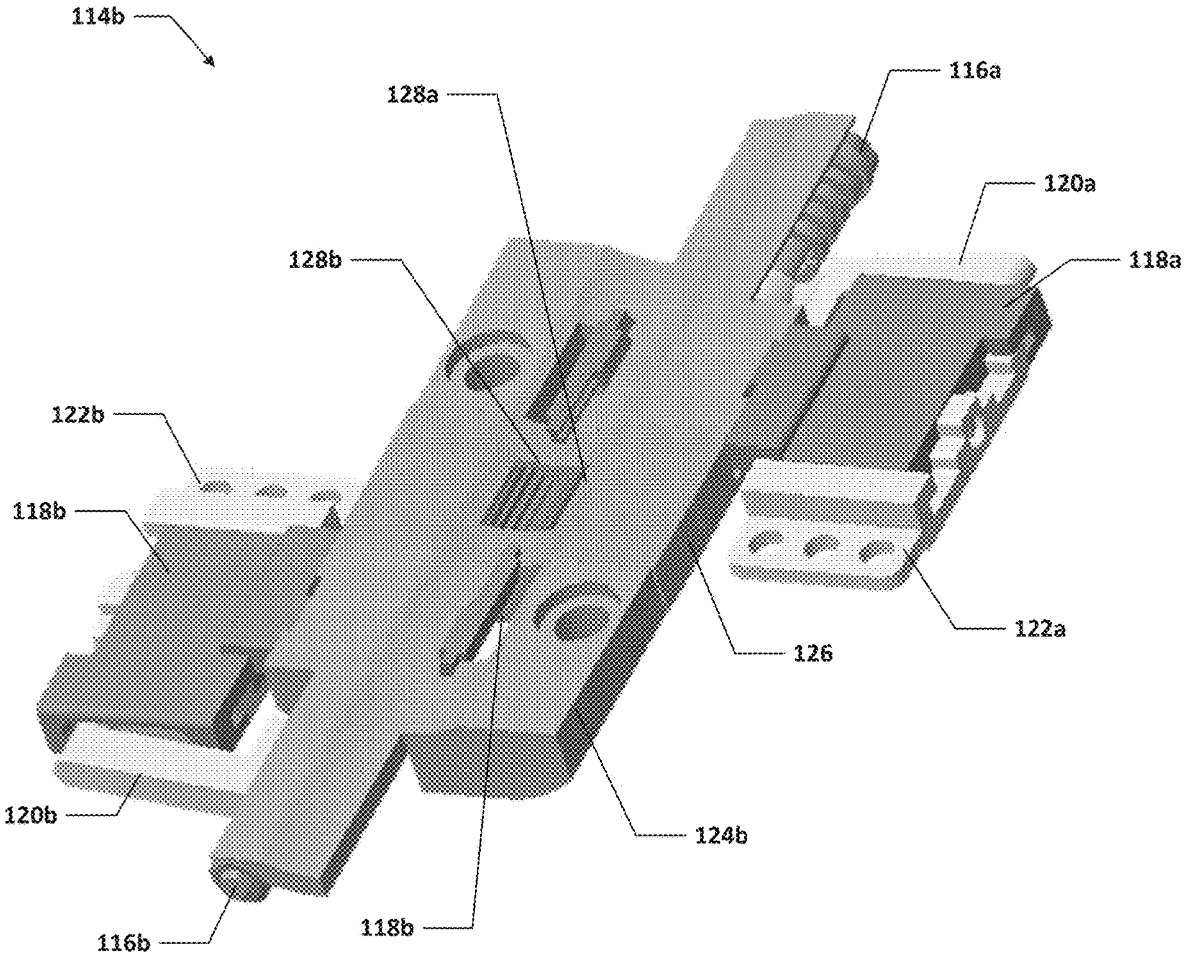
FIGS. 6A and 6B are simplified block diagrams of a portion of a system to enable a hinge and chassis for a flexible display, in accordance with an embodiment of the present disclosure.
Figure 6B:
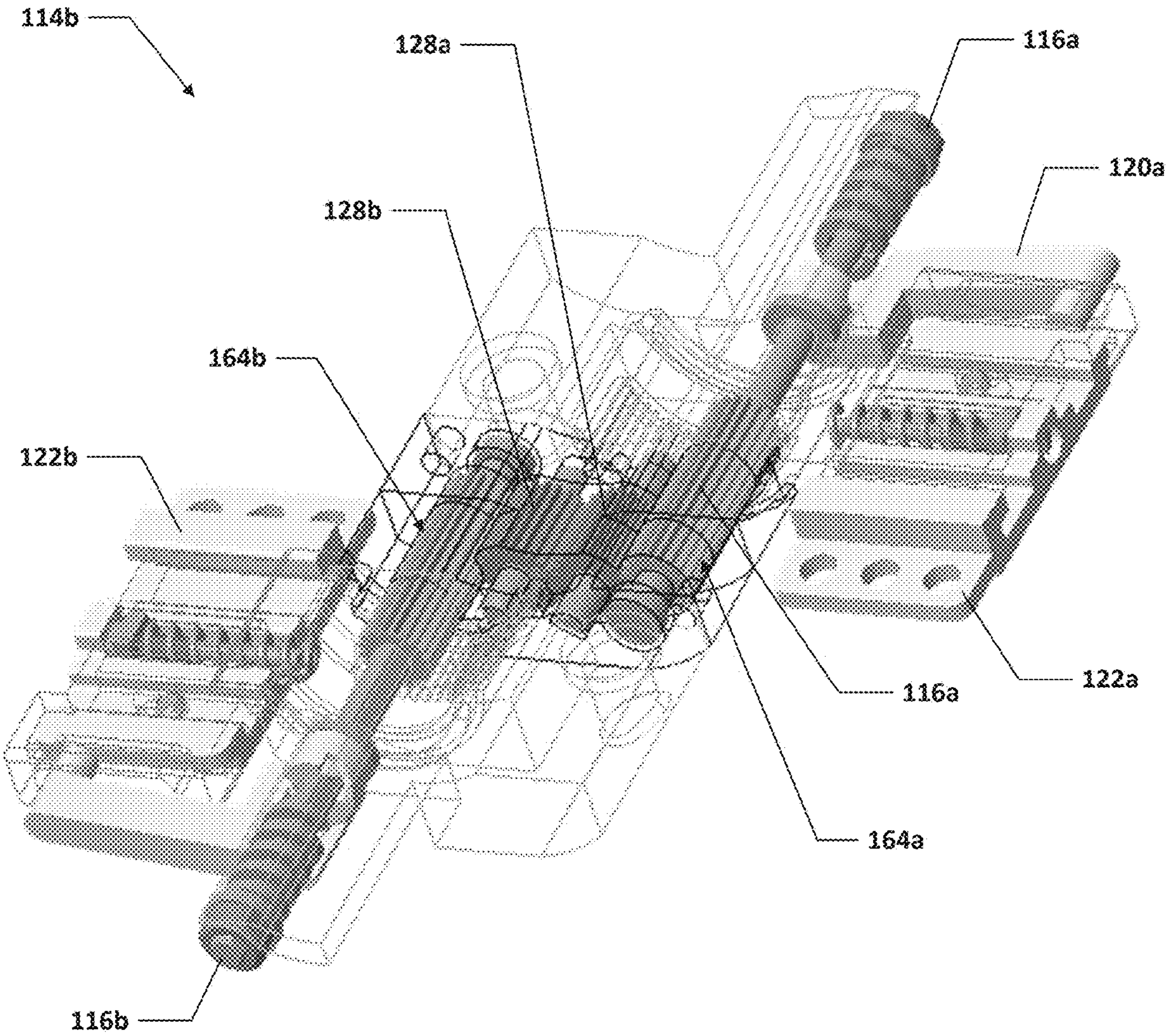

Turning to FIGS. 6A and 6B, FIGS. 6A and 6B are simplified block diagrams of a portion of a synchronizing hinge mechanism 114*b* in a flat configuration, in accordance with an embodiment of the present disclosure. The synchronizing hinge mechanism 114*b* can include the first hinge pivot 116*a*, the second hinge pivot 116*b*, the first chassis portion lift arm 118*a*, the second chassis portion lift arm 118*b*, the first lift arm guide 120*a*, the second lift arm guide 120*b*, the first chassis attachment housing 122*a*, the second chassis attachment housing 122*b*, a hinge housing 124*b* (not shown in FIG. 6B), the synchronization gear housing 126, the first synchronizing gear 128*a*, and the second synchronizing gear 128*b*. Note that the hinge housing 124*b* does not include the flexible display sink 130.

A portion of the first chassis portion lift arm 118*a* and the second chassis portion lift arm 118*b* can include the teeth 162 (not referenced). At least a portion of the first hinge pivot 116*a* can have the splined shaft 164*a* (illustrated in FIG. 6B) and at least a portion of the second hinge pivot 116*b* can have the splined shaft 164*b* (illustrated in FIG. 6B). One end of the first chassis portion lift arm 118*a* (the portion with the teeth 162) can be rotatably or pivotably coupled to the first hinge pivot 116*a* (the portion of the first hinge pivot 116*a* that includes the splined shaft 164*a*) and a second end of the first chassis portion lift arm 118*a* can be coupled to the first portion chassis 106 (not shown). One end of the second chassis portion lift arm 118*b* (the portion with the teeth 162) can be rotatably or pivotably coupled to the second hinge pivot 116*b* (the portion of the second hinge pivot 116*b* that includes the splined shaft 164*b*) and a second end of the second chassis portion lift arm 118*b* can be coupled to the second portion chassis 108 (not shown). The first lift arm guide 120*a* can be coupled to the synchronization gear housing 126 and help guide the first chassis portion lift arm 118*a* during rotation when an electronic device that includes the synchronizing hinge mechanism 114*b* is bent. The second lift arm guide 120*b* can be coupled to the synchronization gear housing 126 and help guide the second chassis portion lift arm 118*b* during rotation when the electronic device that includes the synchronizing hinge mechanism 114*b* is bent.

Figure 7A:
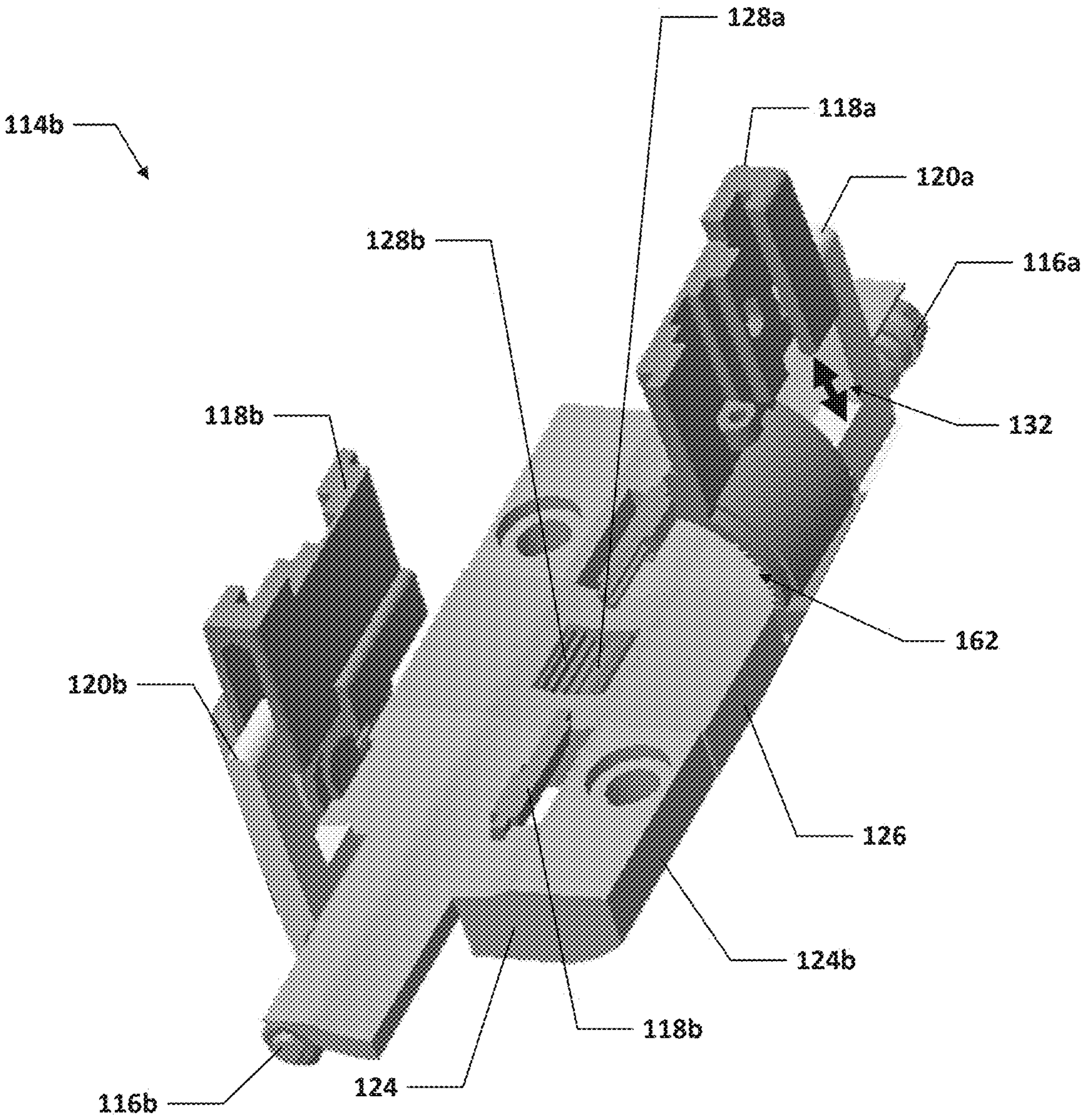
FIGS. 7A and 7B are simplified block diagrams of a portion of a system to enable a hinge and chassis for a flexible display, in accordance with an embodiment of the present disclosure.
Figure 7B:
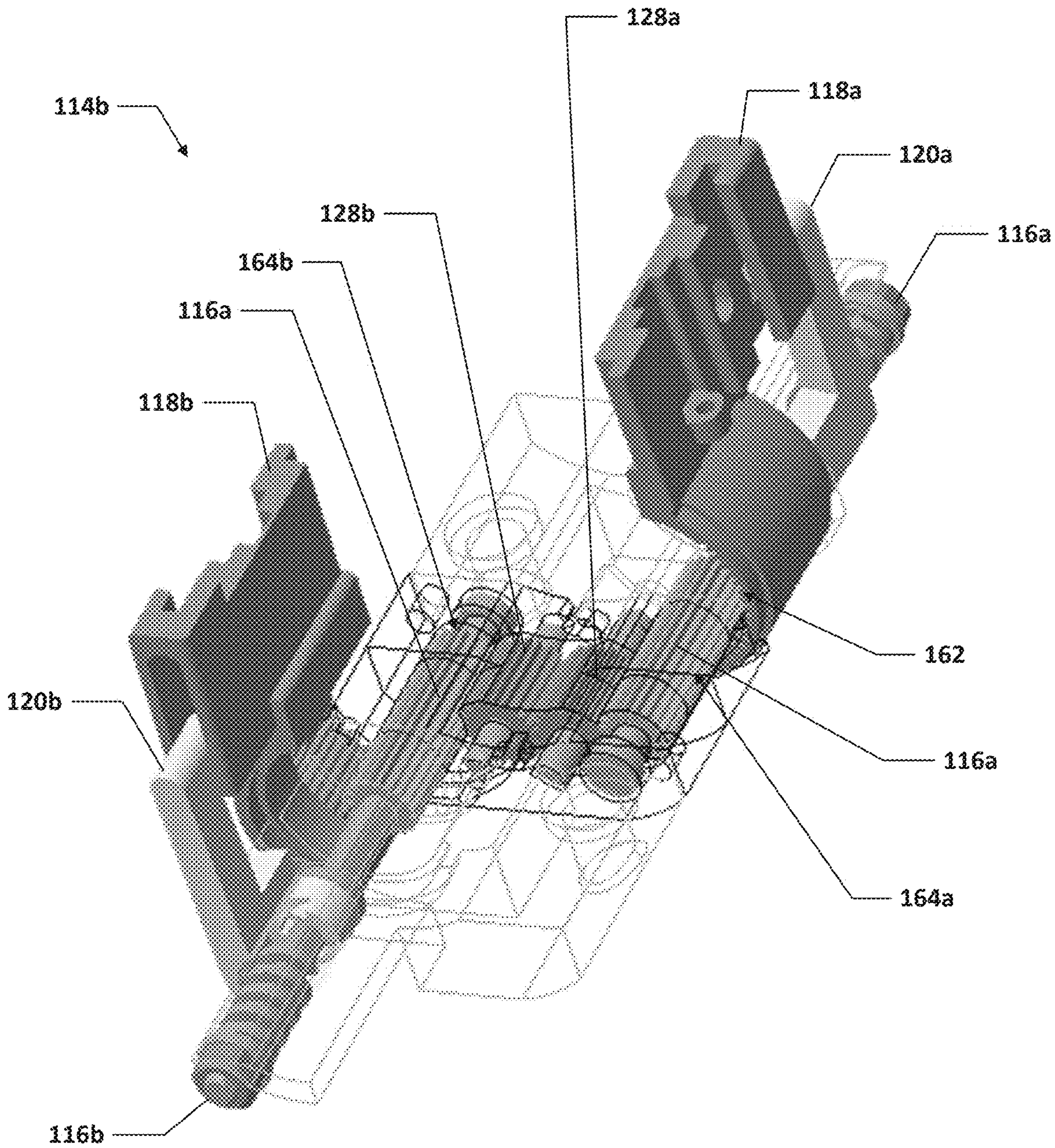

Turning to FIGS. 7A and 7B, FIGS. 7A and 7B are simplified block diagrams of a portion of the synchronizing hinge mechanism 114*b* in a closed configuration, in accordance with an embodiment of the present disclosure. The synchronizing hinge mechanism 114*b* can include the first hinge pivot 116*a*, the second hinge pivot 116*b*, the first chassis portion lift arm 118*a*, the second chassis portion lift arm 118*b*, the first lift arm guide 120*a*, the second lift arm guide 120*b*, the first chassis attachment housing 122*a*, the second chassis attachment housing 122*b*, the hinge housing 124*b* (not shown in FIG. 7B), the synchronization gear housing 126, the first synchronizing gear 128*a*, and the second synchronizing gear 128*b*.

A portion of the first chassis portion lift arm 118*a* and the second chassis portion lift arm 118*b* can include the teeth 162 (referenced in FIGS. 7A and 7B with respect to the first chassis portion lift arm 118*a*). At least a portion of the first hinge pivot 116*a* can have the splined shaft 164*a* (illustrated in FIG. 7B) and at least a portion of the second hinge pivot 116*b* can have the splined shaft 164*b* (illustrated in FIG. 7B). When the electronic device that includes the synchronizing hinge mechanism 114*b* is bent and the synchronizing hinge mechanism 114*b* is in a closed configuration, the first chassis portion lift arm 118*a* rotates around the first hinge pivot 116*a* and, due to the arc profile of the first chassis portion lift arm 118*a*, extends to increase the distance 132 between the first chassis portion lift arm 118*a* and the hinge housing 124*a*. Also, the second chassis portion lift arm 118*b* rotates around the second hinge pivot 116*b* and, due to the arc profile of the second chassis portion lift arm 118*b*, extends to increase the distance 132 (not referenced) between the second chassis portion lift arm 118*b* and the hinge housing 124*b*. Because the first chassis portion lift arm 118*a* is coupled to the first portion chassis 106 (not shown) and the second chassis portion lift arm 118*a* is coupled to the second portion chassis 108 (not shown), the increase in the distance 132 between the first chassis portion lift arm 118*a* and the hinge housing 124*b* and the increase in distance 132 (not referenced) between the second chassis portion lift arm 118*b* and the hinge housing 124*b* can help allow the synchronizing hinge mechanism 114*a* to accommodate the length change in the flexible display as the electronic device is bent.

The first lift arm guide 120*a* can help guide the first chassis portion lift arm 118*a* as it moves away from and towards the hinge housing 124*b*. Also, the second lift arm guide 120*b* can help guide the second chassis portion lift arm 118*b* as it moves away from and towards the hinge housing 124*b*. The hinge housing 124*b* can provide a protective covering for the first hinge pivot 116*a*, the second hinge pivot 116*b*, the first synchronizing gear 128*a*, and the second synchronizing gear 128*b*. The teeth 162 on the first chassis portion lift arm 118*a* can mesh and engage with the portion of the first hinge pivot 116*a* that includes the splined shaft 164*a* and the teeth 162 on the second chassis portion lift arm 118*b* can mesh and engage with the portion of the second hinge pivot 116*b* that includes the splined shaft 164*b* to help ensure relatively smooth rotation and synchronization of the first portion chassis 106 (not shown) and the second portion chassis 108 (not shown) as the electronic device is bent. In addition, the first synchronizing gear 128*a* and the second synchronizing gear 128*b* can help ensure relatively smooth rotation and synchronization of the first portion chassis 106

(not shown) and the second portion chassis 108 (not shown) as the electronic device is bent.

Figure 8A:
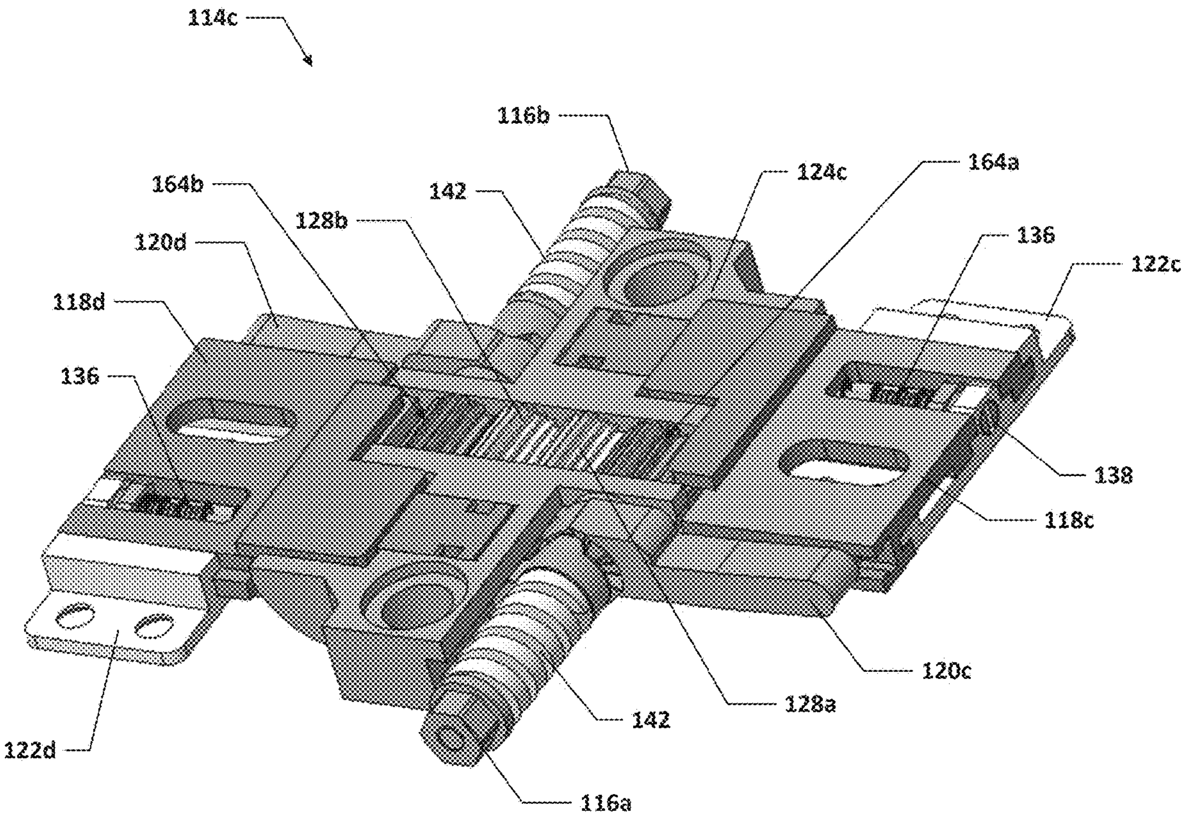
FIGS. 8A and 8B are simplified block diagrams of a portion of a system to enable a hinge and chassis for a flexible display, in accordance with an embodiment of the present disclosure
Figure 8B:
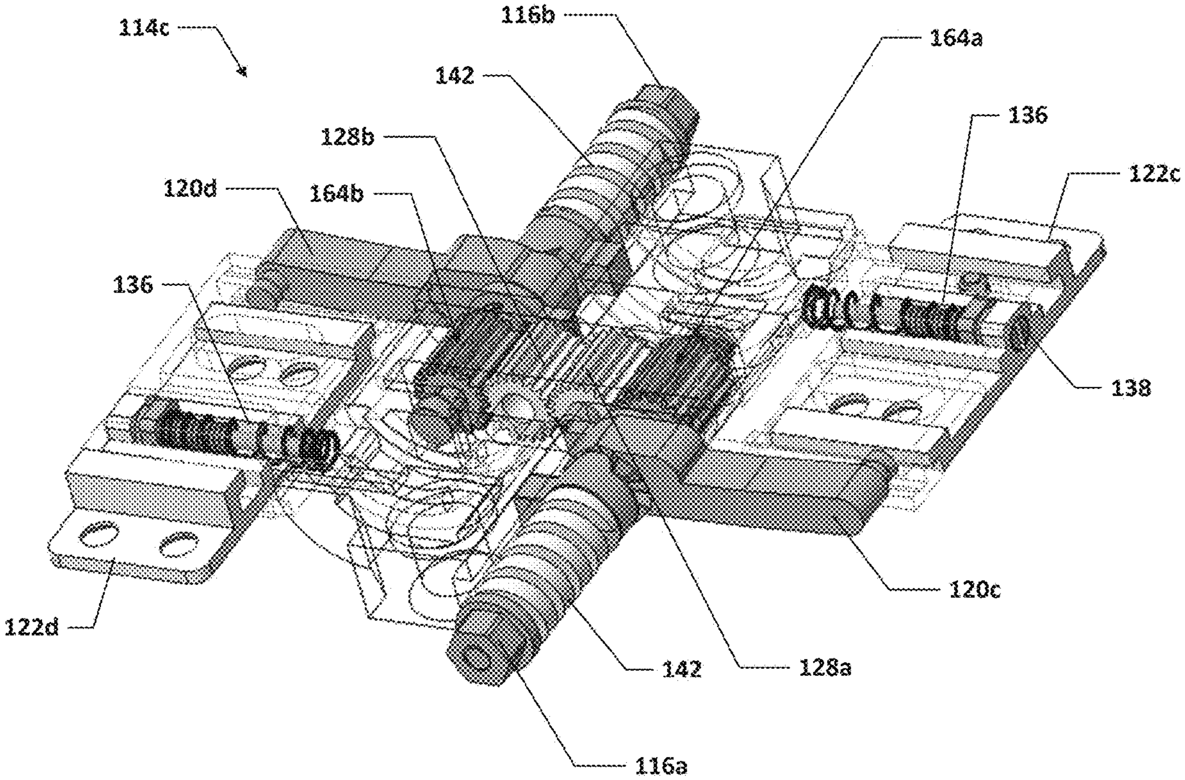

Turning to FIGS. 8A and 8B, FIGS. 8A and 8B are simplified block diagrams of a portion of a synchronizing hinge mechanism 114*c* in a flat configuration, in accordance with an embodiment of the present disclosure. The synchronizing hinge mechanism 114*c* can include the first hinge pivot 116*a*, the second hinge pivot 116*b*, the first chassis portion lift arm 118*e*, a second chassis portion lift arm 118*f*, a first lift arm guide 120*c*, a second lift arm guide 120*d*, a first chassis attachment housing 122*c*, a second chassis attachment housing 122*d*, and a hinge housing 124*c*. The first chassis portion lift arm 118*e* can include one or more elastic mechanisms 136 and the second chassis portion lift arm 118*f* can include one or more elastic mechanisms 136. In an example, the one or more elastic mechanisms 136 can be a spring or some other similar elastic mechanism. Each of the one or more elastic mechanisms 136 can include a tension adjustment mechanism 138 to adjust the tension of the elastic mechanism.

A portion of the first chassis portion lift arm 118*c* and the second chassis portion lift arm 118*d* can have an arc profile and include the teeth 162 (not referenced). At least a portion of the first hinge pivot 116*a* can have the splined shaft 164*a* and at least a portion of the second hinge pivot 116*b* can have the splined shaft 164*b*. One end of the first chassis portion lift arm 118*d* (the portion with the teeth 162) can be rotatably or pivotably coupled to the first hinge pivot 116*a* (the portion of the first hinge pivot 116*a* that includes the splined shaft 164*a*) and a second end of the first chassis portion lift arm 118*a* can be coupled to the first portion chassis 106 (not shown). One end of the second chassis portion lift arm 118*d* (the portion with the teeth 162) can be rotatably or pivotably coupled to the second hinge pivot 116*b* (the portion of the second hinge pivot 116*b* that includes the splined shaft 164*b*) and a second end of the second chassis portion lift arm 118*d* can be coupled to the second portion chassis 108 (not shown).

Figure 9A:
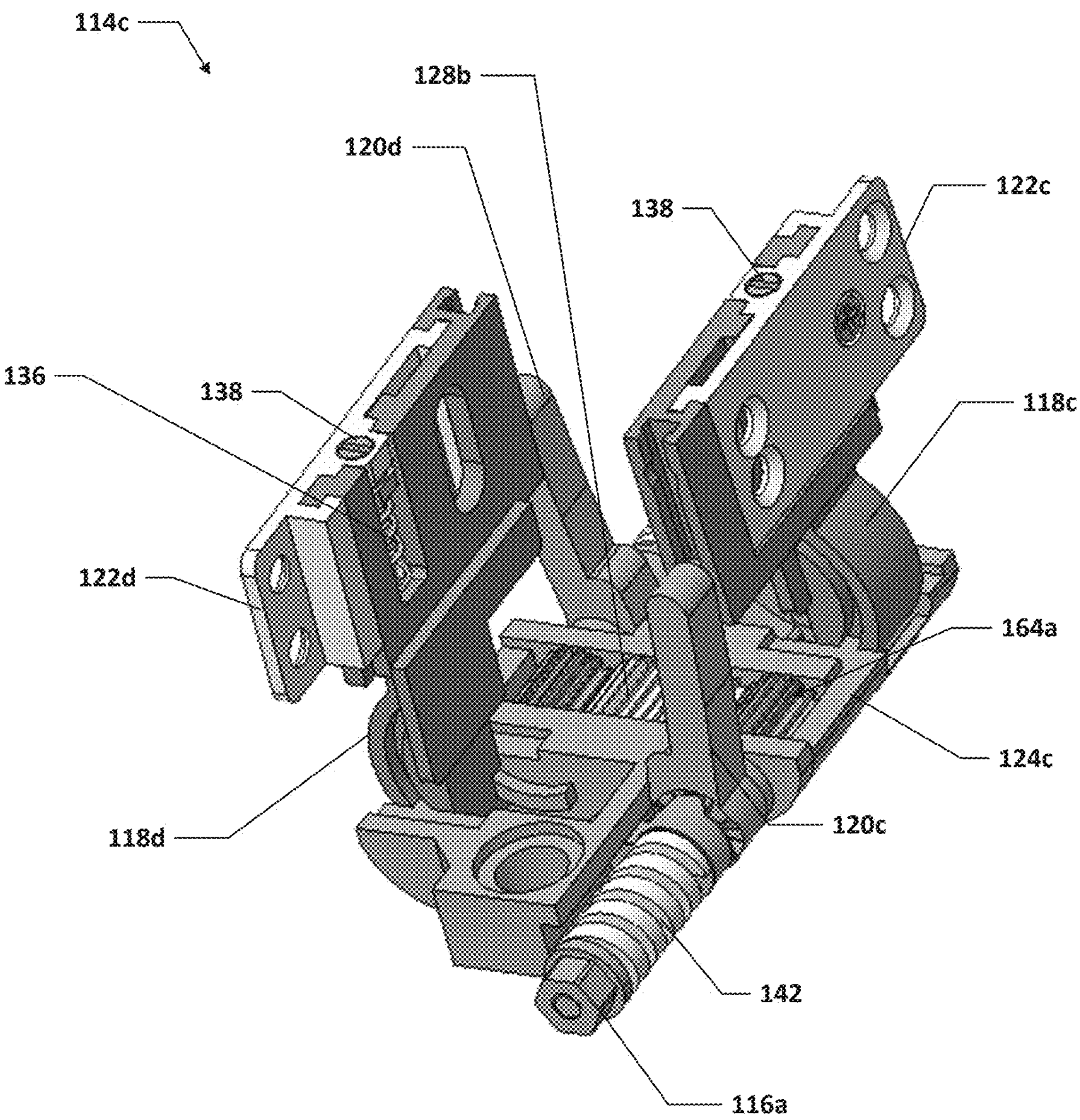
FIGS. 9A and 9B are simplified block diagrams of a portion of a system to enable a hinge and chassis for a flexible display, in accordance with an embodiment of the present disclosure
Figure 9B:
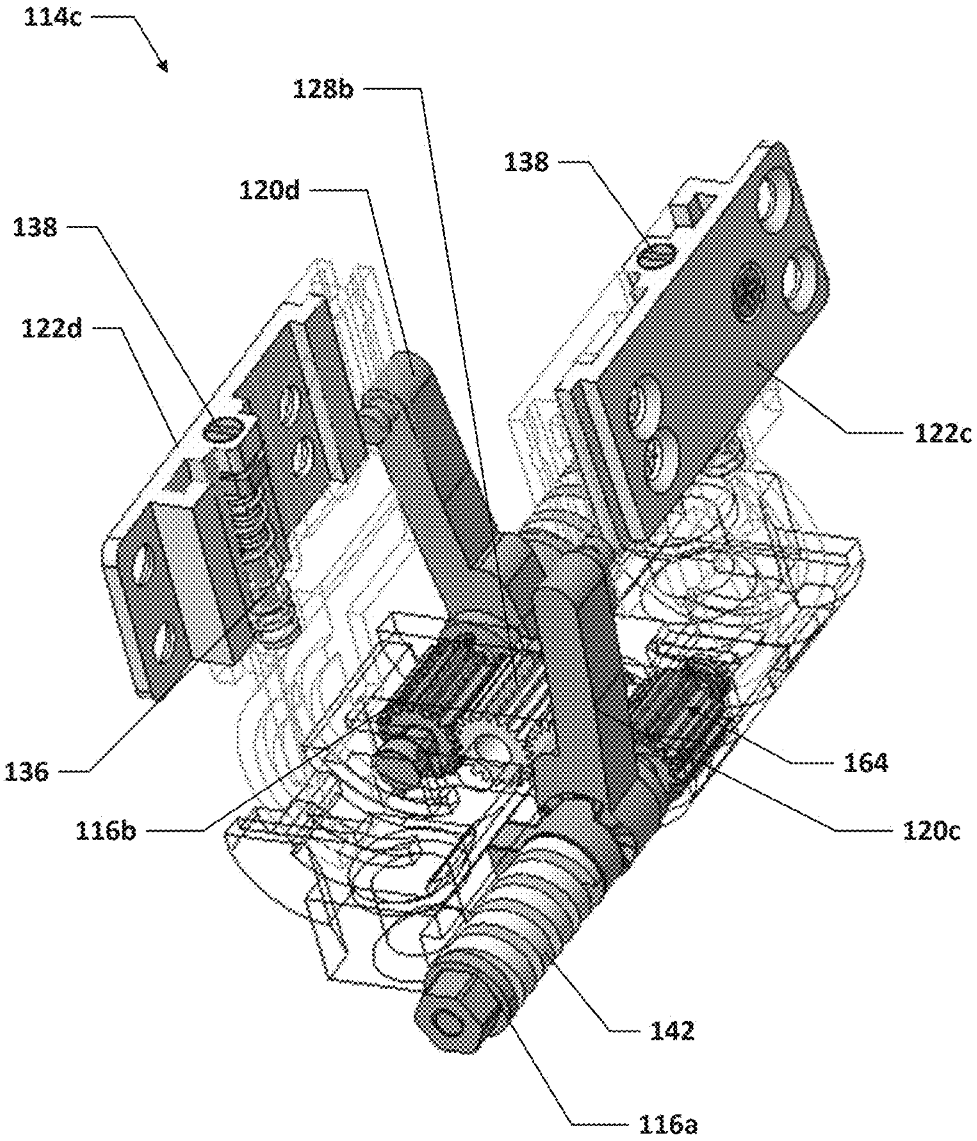

Turning to FIGS. 9A and 9B, FIGS. 9A and 9B are simplified block diagrams of a portion of a synchronizing hinge mechanism 114*c* in a closed configuration, in accordance with an embodiment of the present disclosure. The synchronizing hinge mechanism 114*c* can include the first hinge pivot 116*a*, the second hinge pivot 116*b*, a first chassis portion lift arm 118*e*, the second chassis portion lift arm 118*f*, the first chassis attachment housing 122*c*, the second chassis attachment housing 122*d*, and the hinge housing 124*c*. The first chassis portion lift arm 118*e* can include one or more elastic mechanisms 136 and the second chassis portion lift arm 118*f* can include the one or more elastic mechanisms 136. Each of the one or more elastic mechanisms 136 can include the tension adjustment mechanism 138 to adjust the tension of the elastic mechanism.

A portion of the first chassis portion lift arm 118*c* and the second chassis portion lift arm 118*d* can include the teeth 162 (not referenced). At least a portion of the first hinge pivot 116*a* can have the splined shaft 164*a* (referenced in FIGS. 9A and 9B) and at least a portion of the second hinge pivot 116*b* can have the splined shaft 164*b* (not referenced). When the electronic device that includes the synchronizing hinge mechanism 114*c* is bent and the synchronizing hinge mechanism 114*c* is in a closed configuration, the first chassis portion lift arm 118*c* rotates around the first hinge pivot 116*a* and, due to the arc profile of the first chassis portion lift arm 118*c*, extends to increase the distance 132 between the first chassis portion lift arm 118*c* and the hinge housing 124*a*. Also, the second chassis portion lift arm 118*d* rotates around the second hinge pivot 116*b* and, due to the arc profile of the first chassis portion lift arm 118*d*, extends to increase the distance 132 (not referenced) between the second chassis portion lift arm 118*d* and the hinge housing 124*a*. Because the first chassis portion lift arm 118*c* is coupled to the first portion chassis 106 (not shown) and the second chassis portion lift arm 118*d* is coupled to the second portion chassis 108 (not shown), the increase in the distance 132 (not referenced) between the first chassis portion lift arm 118*c* and the hinge housing 124*a* and the increase in the distance 132 (not referenced) between the second chassis portion lift arm 118*d* and the hinge housing 124*a* can help the synchronizing hinge mechanism 114*c* accommodate the length change in the flexible display as the electronic device is bent. In addition, each of the one or more elastic mechanisms 136 can apply a force to help increase the distance 132 between the first chassis portion lift arm 118*c* and the hinge housing 124*c* and the distance 132 (not referenced) between the second chassis portion lift arm 118*d* and the hinge housing 124*c* to help accommodate the length change in the flexible display as the electronic device is bent.

The teeth 162 on the first chassis portion lift arm 118*c* can mesh and engage with the portion of the first hinge pivot 116*a* that includes the splined shaft 164*a* and the teeth 162 on the second chassis portion lift arm 118*d* can mesh and engage with the portion of the second hinge pivot 116*b* that includes the splined shaft 164*b* to help ensure relatively smooth rotation and synchronization of the first portion chassis 106 (not shown) and the second portion chassis 108 (not shown) as the electronic device is bent. In addition, the first synchronizing gear 128*a* and the second synchronizing gear 128*b* can help ensure relatively smooth rotation and synchronization of the first portion chassis 106 (not shown) and the second portion chassis 108 (not shown) as the electronic device is bent.

Figure 10:
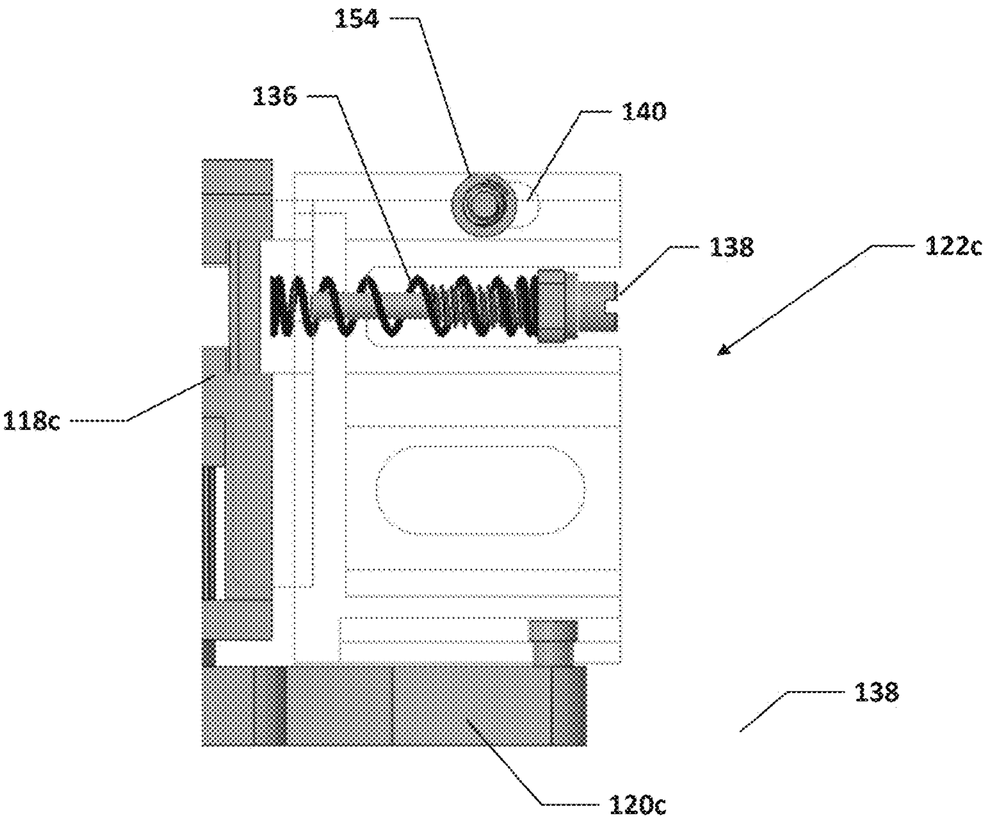
FIG. 10 is a simplified block diagram of a portion of a system to enable a hinge and chassis for a flexible display, in accordance with an embodiment of the present disclosure.

Turning to FIG. 10, FIG. 10 is a simplified block diagram of a portion of the first chassis attachment housing 122*c*, in accordance with an embodiment of the present disclosure. Note that the second chassis attachment housing 122*d* can have a similar structure. The first chassis attachment housing 122*c* can include the one or more elastic mechanisms 136 and mounting holes 140 for securing the first chassis attachment housing 122*c* to the first portion chassis 106 (not shown). The one or more elastic mechanisms 136 can be a spring or some other similar elastic mechanism that provides an outward force against the first chassis portion lift arm 118*c*. Each of the one or more elastic mechanisms 136 can include a tension adjustment mechanism 138 to adjust the tension of the elastic mechanism and the outward force against the first chassis portion lift arm 118*c*. As illustrated in FIG. 10, the first chassis attachment housing 122*c* can be slidably coupled to the first lift arm guide 120*c*.

Figure 11:
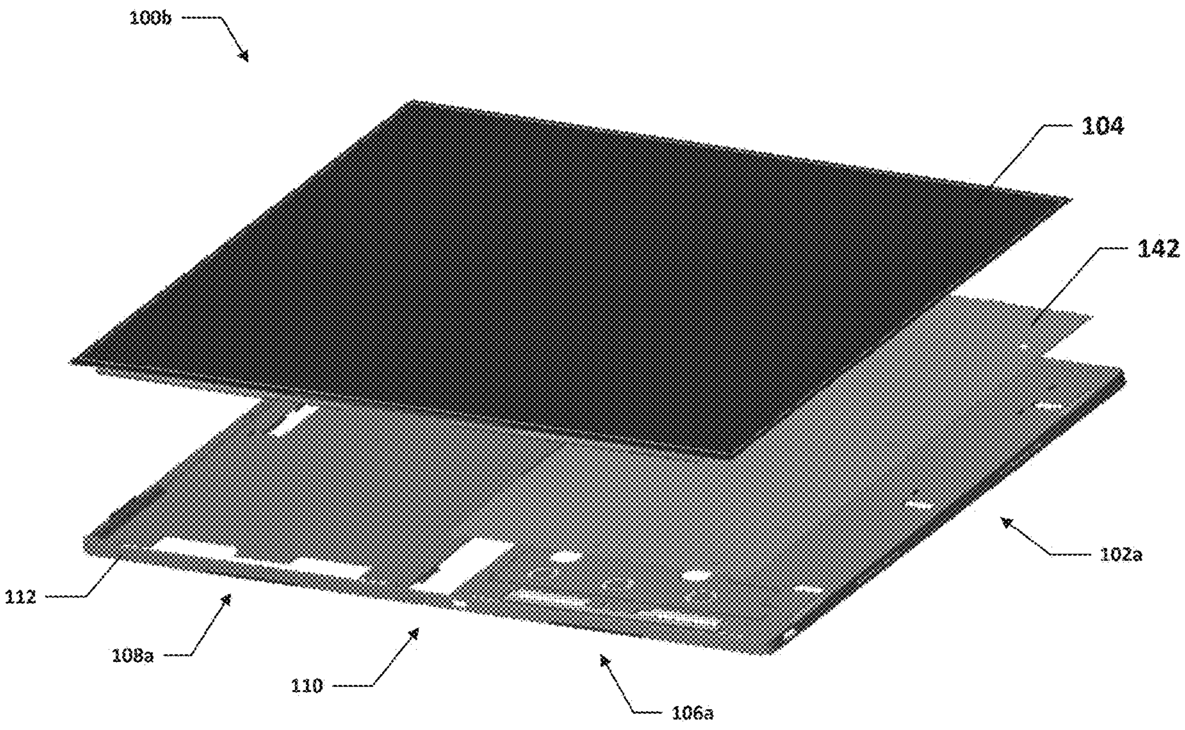
FIG. 11 is a simplified block diagram of a portion of a system to enable a hinge and chassis for a flexible display, in accordance with an embodiment of the present disclosure.

Turning to FIG. 11, FIG. 11 is a simplified block diagram of a portion of electronic device 100*b*, in accordance with an embodiment of the present disclosure. Electronic device 100*b* can include a chassis 102*a*, the flexible display 104, a first portion chassis 106*a*, a second portion chassis 108*a*, the hinge 110, and flexible display support plate 142. The flexible display support plate 142 can be a sliding sheet and can provide support for the flexible display 104 as the electronic device 100*b* is bent.

Figure 12:
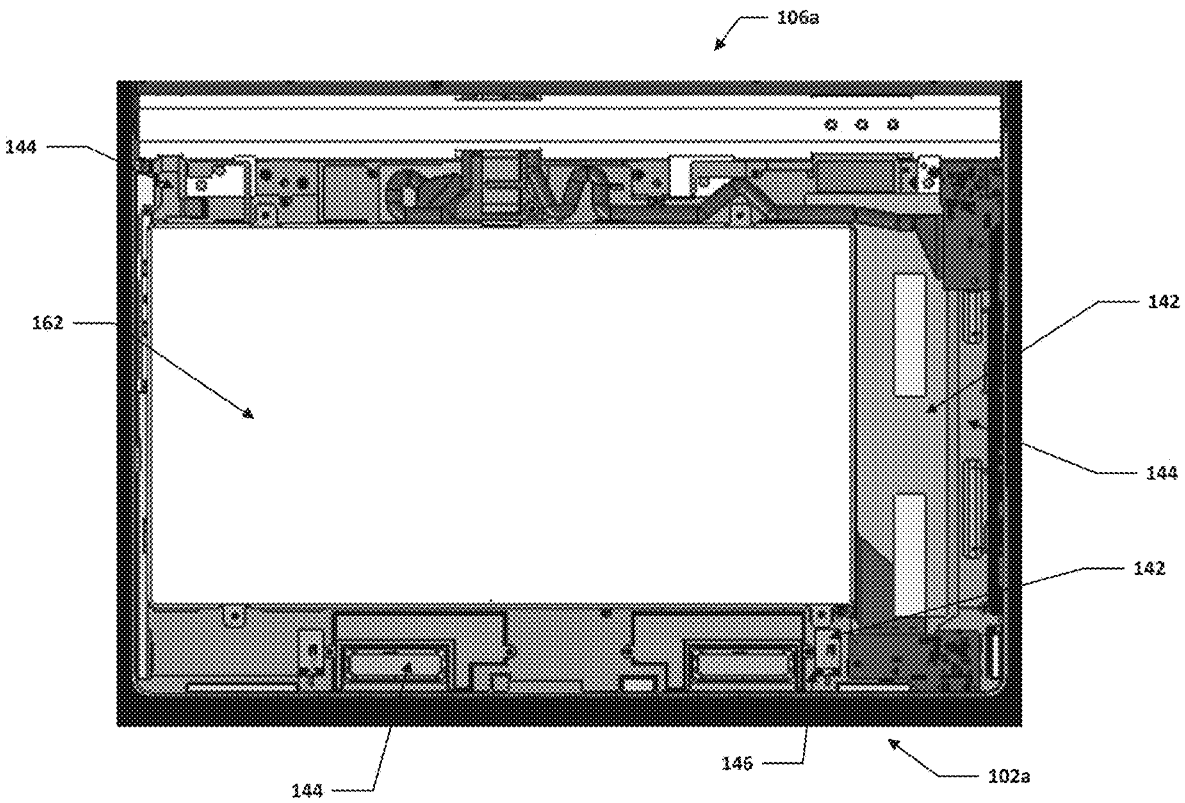
FIG. 12 is a simplified block diagram of a portion of a system to enable a hinge and chassis for a flexible display, in accordance with an embodiment of the present disclosure.

Turning to FIG. 12, FIG. 12 is a simplified block diagram illustrating a portion of the first portion chassis 106*a*, in accordance with an embodiment of the present disclosure. The first portion chassis 106*a* can include the flexible display support plate 142, electronic components 144, and a flexible display support plate slide mechanism 146. In an example, the first portion chassis 106*a* includes a battery. Each of the electronic components 144 can be a device or group of devices available to assist in the operation or function of the electronic device 100*a*. In an example, the flexible display support plate slide mechanism 146 can be a spring or some other mechanism that can slide the flexible display support plate 142 to accommodate the length change in the flexible display 104 (not shown) as the electronic device 100*a* is bent. It should be noted that the second portion chassis 106*b* can have the same or similar structure as the first portion chassis 106*a*.

Figure 13:
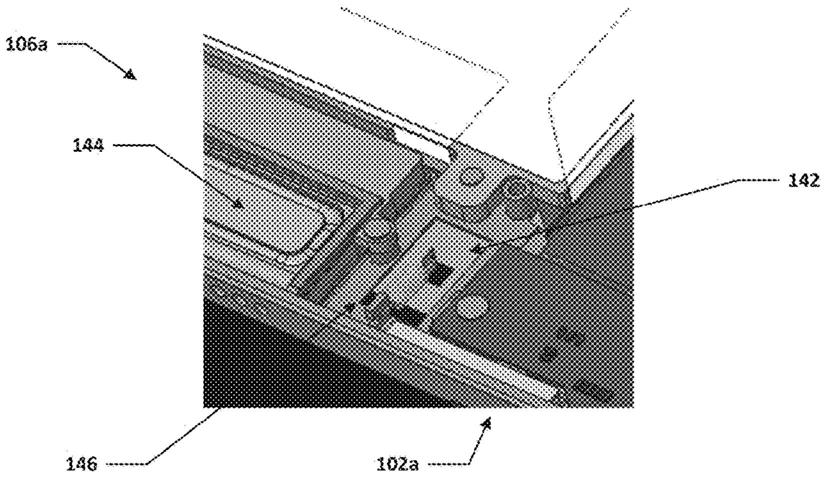
FIG. 13 is a simplified block diagram of a portion of a system to enable a hinge and chassis for a flexible display, in accordance with an embodiment of the present disclosure.

Turning to FIG. 13, FIG. 13 is a simplified block diagram illustrating a portion of the first portion chassis 106*a*, in accordance with an embodiment of the present disclosure. The first portion chassis 106*a* can include the flexible display support plate 142, electronic components 144, and a flexible display support plate slide mechanism 146. In an example, flexible display support plate slide mechanism 146 can be a spring or some other mechanism that can slide the flexible display support plate 142 to accommodate the length change in the flexible display 104 (not shown) as the electronic device 100*a* is bent.

Figure 14:
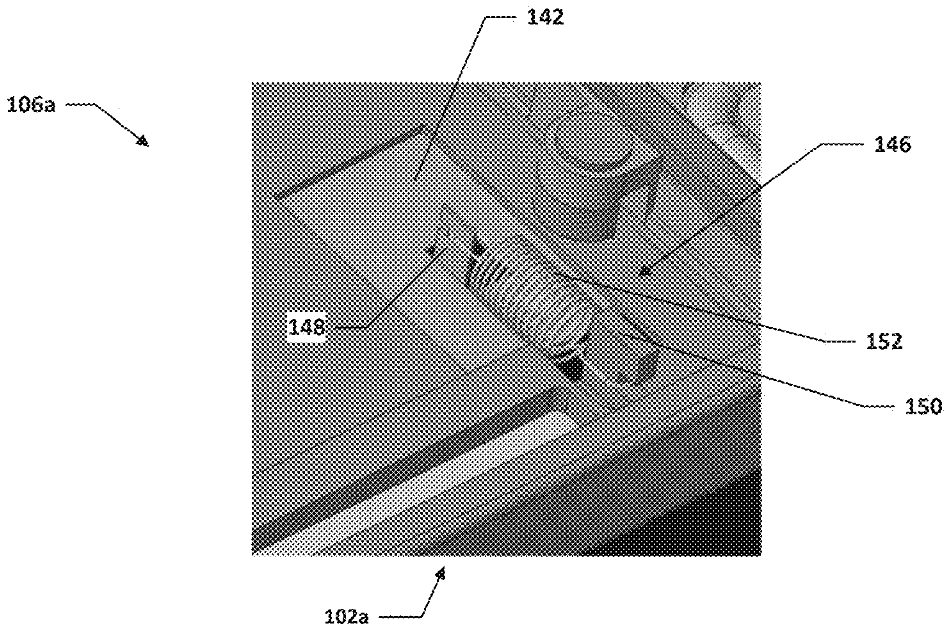
FIG. 14 is a simplified block diagram of a portion of a system to enable a hinge and chassis for a flexible display, in accordance with an embodiment of the present disclosure.

Turning to FIG. 14, FIG. 14 is a simplified block diagram illustrating a portion of the first portion chassis 106*a*. The first portion chassis 106*a* can include the flexible display support plate 142, electronic components 144, and a flexible display support plate slide mechanism 146. In an example, the flexible display support plate slide mechanism 146 can include a support plate elastic mechanism attachment tab 148, a chassis elastic mechanism attachment tab 150, and elastic mechanism 152. The support plate elastic mechanism attachment tab 148 is attached to the flexible display support plate 142 and couples the elastic mechanism 152 to the flexible display support plate 142. The chassis elastic mechanism attachment tab 150 is attached to the chassis 102*a* and couples the elastic mechanism 152 to the chassis 102*a*. When the electronic device 100*a* is bent, the elastic mechanism 152 can apply a force on the support plate elastic mechanism attachment tab 148 to pull the flexible display support plate 142 towards the chassis elastic mechanism attachment tab 150 to help accommodate the length change in the flexible display 104 (not shown).

Figure 15:
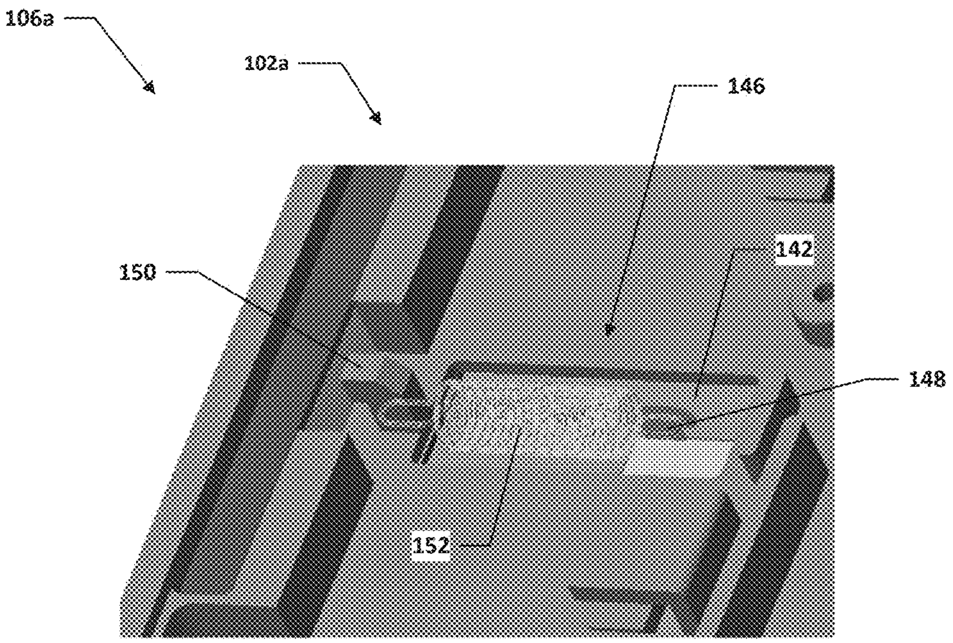
FIG. 15 is a simplified block diagram of a portion of a system to enable a hinge and chassis for a flexible display, in accordance with an embodiment of the present disclosure.

Turning to FIG. 15, FIG. 15 is a simplified block diagram illustrating a portion of the first portion chassis 106*a*, in accordance with an embodiment of the present disclosure. The first portion chassis 106*a* can include the flexible display support plate 142, electronic components 144, and the flexible display support plate slide mechanism 146. In an example, the flexible display support plate slide mechanism 146 can include the support plate elastic mechanism attachment tab 148, the chassis elastic mechanism attachment tab 150, and the elastic mechanism 152. The support plate elastic mechanism attachment tab 148 is attached to the flexible display support plate 142 and couples the elastic mechanism 152 to the flexible display support plate 142. The chassis elastic mechanism attachment tab 150 is attached to the chassis 102*a* and couples the elastic mechanism 152 to the chassis 102*a*. When the electronic device 100*a* is bent, the elastic mechanism 152 can apply a force on the support plate elastic mechanism attachment tab 148 to pull the flexible display support plate 142 towards the chassis elastic mechanism attachment tab 150 to help accommodate the length change in the flexible display 104 (not shown).

Figure 16:
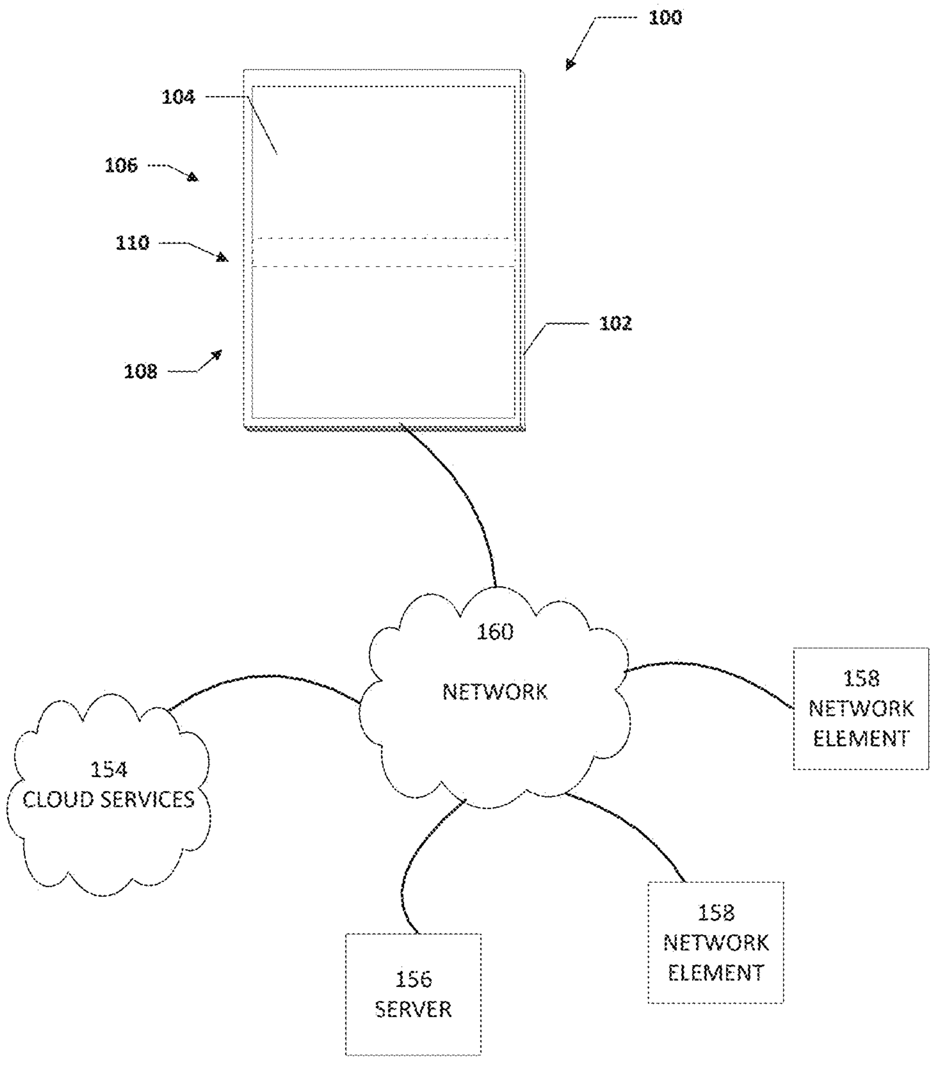
FIG. 16 is a block diagram illustrating an example device that include a hinge and chassis for a flexible display, in accordance with an embodiment of the present disclosure.

Turning to FIG. 16, FIG. 16 is a simplified block diagram of the electronic device configured with a hinge and chassis for a flexible display, in accordance with an embodiment of the present disclosure. For example, as illustrated in FIG. 16, the electronic device 100 includes the chassis 102 and the flexible display 104. The chassis 102 can include the first portion chassis 106 and the second portion chassis 108. The first portion chassis 106 can be rotationally or pivotably coupled to the second portion chassis 108 using the hinge 110. The electronic device 100 may be in communication with cloud services 154, server 156, and/or one or more network elements 158 using network 160. In some examples, the electronic device 100 may be a standalone device and not connected to network 160 or another device.

Elements of FIG. 16 may be coupled to one another through one or more interfaces employing any suitable connections (wired or wireless), which provide viable pathways for network (e.g., the network 160, etc.) communications. Additionally, any one or more of these elements of FIG. 16 may be combined or removed from the architecture based on particular configuration needs. The network 160 may include a configuration capable of transmission control protocol/Internet protocol (TCP/IP) communications for the transmission or reception of packets in a network. The electronic device 100 may also operate in conjunction with a user datagram protocol/IP (UDP/IP) or any other suitable protocol where appropriate and based on particular needs.

Turning to the network infrastructure of FIG. 16, the network 160 represents a series of points or nodes of interconnected communication paths for receiving and transmitting packets of information. The network 160 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In the network 160, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks.

In an example implementation, the electronic device 100 is meant to encompass a computer, a personal digital assistant (PDA), a laptop or electronic notebook, a cellular telephone, a smartphone, an IP phone, network elements, network appliances, or any other device, component, element, or object that includes a flexible display. The electronic device 100 may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. The electronic device 100 may include virtual elements.

In regards to the internal structure, the electronic device 100 can include memory elements for storing information to be used in operations. The electronic device 100 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received could be provided in any database, register, queue, table, cache, control list, or other storage structure, all of which can be referenced at any suitable timeframe. Any such storage options may also be included within the broad term 'memory element' as used herein.

In certain example implementations, functions may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for operations. This includes the memory elements being able to store software, logic, code, or processor instructions that are executed to carry out operations or activities.

Additionally, the electronic device 100 can include one or more processors that can execute software or an algorithm. In one example, the processors could transform an element or an article (e.g., data) from one state or thing to another state or thing. In another example, activities may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Implementations of the embodiments disclosed herein may be formed or carried out on or over a substrate, such as a non-semiconductor substrate or a semiconductor substrate. In one implementation, the non-semiconductor substrate may be silicon dioxide, an inter-layer dielectric composed of silicon dioxide, silicon nitride, titanium oxide and other transition metal oxides. Although a few examples of materials from which the non-semiconducting substrate may be formed are described here, any material that may serve as a foundation upon which a non-semiconductor device may be built falls within the spirit and scope of the embodiments disclosed herein.

In another implementation, the semiconductor substrate may be a crystalline substrate formed using a bulk silicon or a silicon-on-insulator substructure. In other implementations, the semiconductor substrate may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. In other examples, the substrate may be a flexible substrate including 2D materials such as graphene and molybdenum disulphide, organic materials such as pentacene, transparent oxides such as indium gallium zinc oxide poly/amorphous (low temperature of dep) III-V semiconductors and germanium/silicon, and other non-silicon flexible substrates. Although a few examples of materials from which the substrate may be formed are described here, any material that may serve as a foundation upon which a semiconductor device may be built falls within the spirit and scope of the embodiments disclosed herein.

Note that with the examples provided herein, interaction may be described in terms of two, three, or more elements. However, this has been done for purposes of clarity and example only. In certain cases, it may be easier to describe one or more of the functionalities of a given set of flows by only referencing a limited number of elements. It should be appreciated that the electronic device 100 and its teachings are readily scalable and can accommodate a large number of components, as well as more complicated/sophisticated arrangements and configurations. Accordingly, the examples provided should not limit the scope or inhibit the broad teachings of the electronic device 100 and as potentially applied to a myriad of other architectures.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although the electronic device 100 has been illustrated with reference to particular elements and operations, these elements and operations may be replaced by any suitable architecture, protocols, and/or processes that achieve the intended functionality of the electronic device 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example A1, is an electronic device including a chassis, where the chassis includes a first chassis portion and a second chassis portion, a flexible display supported by the chassis, and a hinge. The hinge includes a first chassis attachment housing coupled to the first chassis portion, a first chassis portion lift arm coupled to the first chassis attachment housing, a first hinge pivot coupled to the first chassis portion lift arm, a second chassis attachment housing coupled to the second chassis portion, a second chassis portion lift arm coupled to the second chassis attachment housing, and a second hinge pivot coupled to the second chassis portion lift arm, wherein the first chassis portion lift arm extends to increase a first distance between the first chassis attachment housing and the first hinge pivot and the second chassis portion lift arm extends to increase a second distance between the second chassis attachment housing and the second hinge pivot as the flexible display is bent.

In Example A2, the subject matter of Example A1 can optionally include where at least a portion of the first hinge pivot includes a splined shaft that meshes with teeth in the first chassis portion lift arm.

In Example A3, the subject matter of any one of Examples A1-A2 can optionally include synchronizing gears to couple the first hinge pivot to the second hinge pivot.

In Example A4, the subject matter of any one of Examples A1-A3 can optionally include a flexible display sink.

In Example A5, the subject matter of any one of Examples A1-A4 can optionally include where a gap is located between the flexible display and the flexible display sink when the electronic device is in a flat configuration.

In Example A6, the subject matter of any one of Examples A1-A5 can optionally include where the gap between the flexible display and the flexible display sink is greater than two (2) millimeters when the electronic device is in the flat configuration.

In Example A7, the subject matter of any one of Examples A1-A6 can optionally include where the gap between the flexible display and the flexible display sink is reduced as the electronic device is bent from the flat configuration to a closed configuration.

Example AA1 is a hinge that couples a first chassis portion to a second chassis portion, the hinge including a first chassis attachment housing coupled to the first chassis portion, a second chassis attachment housing coupled to the second chassis portion, a first chassis portion lift arm coupled to the first chassis attachment housing, a second chassis portion lift arm coupled to the second chassis attachment housing, a first hinge pivot coupled to the first chassis portion lift arm, and a second hinge pivot coupled to the second chassis portion lift arm, wherein, as a flexible display that is supported by the first chassis portion and the second chassis portion is bent, the first chassis attachment housing moves away from the first hinge pivot and the second chassis attachment housing moves away from the second hinge pivot.

In Example AA2, the subject matter of Example AA1 can optionally include where at least a portion of the first hinge pivot includes a splined shaft that meshes with teeth in the first chassis portion lift arm.

In Example AA3, the subject matter of any one of Examples AA1-AA2 can optionally include a flexible display sink.

In Example AA4, the subject matter of any one of Examples AA1-AA3 can optionally include where a gap is located between the flexible display and the flexible display sink when the hinge is in a flat configuration.

In Example AA5, the subject matter of any one of Examples AA1-AA4 can optionally include where the gap between the flexible display and the flexible display sink is greater than one (1) millimeter when the hinge is in the flat configuration.

In Example AA6, the subject matter of any one of Examples AA1-AA5 can optionally include where the first chassis attachment housing includes one or more elastic mechanisms that push against the first chassis portion lift arm.

In Example AA7, the subject matter of any one of Examples AA1-AA6 can optionally include where the first chassis attachment housing includes at least one spring.

Example AAA1 is an electronic device including a flexible display, a chassis, wherein the chassis has a first chassis portion and a second chassis portion, and a hinge. The hinge includes a first chassis attachment housing coupled to the first chassis portion, a second chassis attachment housing coupled to the second chassis portion, a first chassis portion lift arm coupled to the first chassis attachment housing, wherein at least a portion of the first chassis portion lift arm includes teeth, a second chassis portion lift arm coupled to the second chassis attachment housing, wherein at least a portion of the second chassis portion lift arm includes teeth, and a flexible display sink located between the first chassis portion lift arm and the second chassis portion lift arm.

In Example AAA2, the subject matter of Example AAA1 can optionally include a first hinge pivot coupled to the first chassis portion lift arm, wherein at least a portion of the first hinge pivot includes a splined shaft that meshes with the teeth in the first chassis portion lift arm and a second hinge pivot coupled to the second chassis portion lift arm, wherein at least a portion of the second hinge pivot includes a splined shaft that meshes with the teeth in the second chassis portion lift arm.

In Example AAA3, the subject matter of any one of Examples AAA1-AAA2 can optionally include synchronizing gears between the first hinge pivot and the second hinge pivot.

In Example AAA4, the subject matter of any one of Examples AAA1-AAA3 can optionally include a flexible display sink.

In Example AAA5, the subject matter of any one of Examples AAA1-AAA4 can optionally include where a gap is located between the flexible display and the flexible display sink when the electronic device is in a flat configuration.

In Example AAA6, the subject matter of any one of Examples AAA1-AAA5 can optionally include where the gap between the flexible display and the flexible display sink is reduced as the electronic device is bent from the flat configuration to a closed configuration.

What is claimed is:

1. An electronic device comprising:
- a chassis, wherein the chassis includes a first chassis portion and a second chassis portion;
- a flexible display supported by the chassis; and
- a hinge, wherein the hinge includes:
  - a first chassis attachment housing coupled to the first chassis portion;
  - a first chassis portion lift arm coupled to the first chassis attachment housing;
  - a first hinge pivot coupled to the first chassis portion lift arm, wherein at least a portion of the first hinge pivot includes a solined shaft that meshes with teeth in the first chassis portion lift arm;
  - a second chassis attachment housing coupled to the second chassis portion;

a second chassis portion lift arm coupled to the second chassis attachment housing; and a second hinge pivot coupled to the second chassis portion lift arm, wherein at least a portion of the second hinge pivot includes a splined shaft that meshes with teeth in the second chassis portion lift arm, and the first chassis portion lift arm extends to increase a first distance between the first chassis attachment housing and the first hinge pivot and the second chassis portion lift arm extends to increase a second distance between the second chassis attachment housing and the second hinge pivot as the flexible display is bent.

2. The electronic device of claim 1, wherein the hinge further includes:

synchronizing gears to couple the first hinge pivot to the second hinge pivot.

3. The electronic device of claim 1, wherein the hinge further includes:

a flexible display sink.

4. The electronic device of claim 3, wherein a gap is located between the flexible display and the flexible display sink when the electronic device is in a flat configuration.

5. The electronic device of claim 4, wherein the gap between the flexible display and the flexible display sink is greater than two (2) millimeters when the electronic device is in the flat configuration.

6. The electronic device of claim 4, wherein the gap between the flexible display and the flexible display sink is reduced as the electronic device is bent from the flat configuration to a closed configuration.

7. A hinge that couples a first chassis portion to a second chassis portion, the hinge comprising:

a first chassis attachment housing coupled to the first chassis portion;

a second chassis attachment housing coupled to the second chassis portion;

a first chassis portion lift arm coupled to the first chassis attachment housing;

a second chassis portion lift arm coupled to the second chassis attachment housing;

a first hinge pivot coupled to the first chassis portion lift arm, wherein at least a portion of the first hinge pivot includes a splined shaft that meshes with teeth in the first chassis portion lift arm; and a second hinge pivot coupled to the second chassis portion lift arm, wherein at least a portion of the second hinge pivot includes a splined shaft that meshes with teeth in the second chassis portion lift arm, and wherein, as a flexible display that is supported by the first chassis portion and the second chassis portion is bent, the first chassis attachment housing moves away from the first hinge pivot and the second chassis attachment housing moves away from the second hinge pivot.

8. The hinge of claim 7, wherein the hinge further includes:

a flexible display sink.

9. The hinge of claim 8, wherein a gap is located between the flexible display and the flexible display sink when the hinge is in a flat configuration.

10. The hinge of claim 9, wherein the gap between the flexible display and the flexible display sink is greater than one (1) millimeter when the hinge is in the flat configuration.

11. The hinge of claim 7, wherein the first chassis attachment housing includes one or more elastic mechanisms that push against the first chassis portion lift arm.

12. The hinge of claim 7, wherein the first chassis attachment housing includes at least one spring.

13. An electronic device comprising:

a flexible display;

a chassis, wherein the chassis has a first chassis portion and a second chassis portion; and a hinge, wherein the hinge includes:

a first chassis attachment housing coupled to the first chassis portion;

a second chassis attachment housing coupled to the second chassis portion;

a first chassis portion lift arm coupled to the first chassis attachment housing, wherein at least a portion of the first chassis portion lift arm includes teeth;

a second chassis portion lift arm coupled to the second chassis attachment housing, wherein at least a portion of the second chassis portion lift arm includes teeth;

a first hinge pivot coupled to the first chassis portion lift arm, wherein at least a portion of the first hinge pivot includes a splined shaft that meshes with the teeth in the first chassis portion lift arm;

a second hinge pivot coupled to the second chassis portion lift arm, wherein at least a portion of the second hinge pivot includes a splined shaft that meshes with the teeth in the second chassis portion lift arm; and a flexible display sink located between the first chassis portion lift arm and the second chassis portion lift arm.

14. The electronic device of claim 13, wherein the hinge further includes:

synchronizing gears between the first hinge pivot and the second hinge pivot.

15. The electronic device of claim 13, wherein the hinge further includes:

a flexible display sink.

16. The electronic device of claim 15, wherein a gap is located between the flexible display and the flexible display sink when the electronic device is in a flat configuration.

17. The electronic device of claim 16, wherein the gap between the flexible display and the flexible display sink is reduced as the electronic device is bent from the flat configuration to a closed configuration.

18. The electronic device of claim 1, wherein the first chassis portion lift arm has an arc profile that allows the first chassis portion lift arm to extend and retract as the flexible display is bent.

19. The hinge of claim 7, wherein the first chassis portion lift arm has an arc profile that allows the first chassis portion lift arm to extend and retract as the flexible display is bent.

20. The electronic device of claim 13, wherein the first chassis portion lift arm has an arc profile that allows the first chassis portion lift arm to extend and retract as the flexible display is bent.

* * * * *